United States Patent
Greco

(10) Patent No.: US 11,222,457 B2
(45) Date of Patent: Jan. 11, 2022

(54) SYSTEMS AND METHODS FOR AUGMENTED REALITY

(71) Applicant: Magic Leap, Inc., Plantation, FL (US)

(72) Inventor: Paul M. Greco, Parkland, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/985,929

(22) Filed: Aug. 5, 2020

(65) Prior Publication Data

US 2021/0019930 A1    Jan. 21, 2021

Related U.S. Application Data

(63) Continuation of application No. PCT/US2019/016721, filed on Feb. 5, 2019.

(60) Provisional application No. 62/627,155, filed on Feb. 6, 2018.

(51) Int. Cl.
| | | |
|---|---|---|
| *G06T 15/00* | (2011.01) | |
| *G02B 27/01* | (2006.01) | |
| *G06F 3/01* | (2006.01) | |
| *G06T 19/00* | (2011.01) | |

(52) U.S. Cl.
CPC ........ *G06T 15/005* (2013.01); *G02B 27/0172* (2013.01); *G06F 3/011* (2013.01); *G06T 19/006* (2013.01)

(58) Field of Classification Search
CPC ..... G06T 15/005; G06T 19/006; G06T 15/00; G06T 19/00; G06T 1/20; G06T 7/70; G06T 19/003; G06T 17/00; G06F 3/011; G06F 3/012; G06F 3/0308; G06F 3/0346; G06F 2203/0384; G06F 3/01; G02B 27/01; G02B 27/0172
See application file for complete search history.

(56) References Cited

U.S. PATENT DOCUMENTS

| | | |
|---|---|---|
| 8,950,867 B2 | 2/2015 | MacNamara |
| 9,215,293 B2 | 12/2015 | Miller |
| 9,417,452 B2 | 8/2016 | Schowengerdt et al. |
| 9,791,700 B2 | 10/2017 | Schowengerdt |
| 9,874,749 B2 | 1/2018 | Bradski et al. |

(Continued)

FOREIGN PATENT DOCUMENTS

| | | |
|---|---|---|
| WO | 2017197381 A1 | 11/2017 |
| WO | 2019156992 A2 | 8/2019 |

OTHER PUBLICATIONS

PCT/US2019/016721, "International Search Report and Written Opinion", dated Apr. 23, 2019, 11 pages.

(Continued)

*Primary Examiner* — Xilin Guo
(74) *Attorney, Agent, or Firm* — Kilpatrick Townsend & Stockton LLP

(57) ABSTRACT

Disclosed is a method of localizing a user operating a plurality of sensing components, preferably in an augmented or mixed reality environment, the method comprising transmitting pose data from a fixed control and processing module and receiving the pose data at a first sensing component, the pose data is then transformed into a first component relative pose in a coordinate frame based on the control and processing module. A display unit in communication with the first sensing component is updated with the transformed first component relative pose to render virtual content with improved environmental awareness.

18 Claims, 27 Drawing Sheets

(56) References Cited

U.S. PATENT DOCUMENTS

| | | |
|---|---|---|
| 10,146,997 B2 | 12/2018 | Kaehler |
| 10,262,462 B2 | 4/2019 | Miller et al. |
| 2004/0167667 A1 | 8/2004 | Goncalves et al. |
| 2005/0168437 A1 | 8/2005 | Carl et al. |
| 2006/0187196 A1 | 8/2006 | Underkoffler et al. |
| 2014/0168261 A1 | 6/2014 | Margolis et al. |
| 2014/0306866 A1 | 10/2014 | Miller et al. |
| 2015/0301599 A1 | 10/2015 | Miller |
| 2016/0026253 A1* | 1/2016 | Bradski ................ H04N 13/344 345/8 |
| 2016/0259404 A1* | 9/2016 | Woods .................... G06F 3/017 |
| 2017/0205903 A1 | 7/2017 | Miller et al. |
| 2017/0307891 A1 | 10/2017 | Bucknor et al. |
| 2017/0357332 A1 | 12/2017 | Balan et al. |
| 2018/0350101 A1 | 12/2018 | Glover et al. |

OTHER PUBLICATIONS

EP19752054.7, "Partial Supplemental European Search Report", dated Mar. 15, 2021, 11 pages.
EP19752054.7, "Partial Supplementary European Search Report", dated Apr. 29, 2021, 11 pages.
Application No. EP19752054.7, Extended European Search Report, dated Sep. 9, 2021, 14 pages.

* cited by examiner

SYSTEMS AND METHODS FOR AUGMENTED REALITY

CROSS-REFERENCES TO RELATED APPLICATIONS

This application is a continuation of International Patent Application No. PCT/US2019/016721, filed Feb. 5, 2019, entitled "SYSTEMS AND METHODS FOR AUGMENTED REALITY," which claims the benefit of and priority to U.S. Provisional Patent Application No. 62/627,155, filed Feb. 6, 2018, entitled "SYSTEMS AND METHODS FOR AUGMENTED REALITY" the entire disclosures of which are hereby incorporated by reference, for all purposes, as if fully set forth herein.

FIELD OF THE INVENTION

The present disclosure relates to systems and methods to localize position and orientation of one or more objects in the context of augmented reality systems.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

For example, referring to FIG. 1, an augmented reality scene (4) is depicted wherein a user of an AR technology sees a real-world park-like setting (6) featuring people, trees, buildings in the background, and a concrete platform (1120). In addition to these items, the user of the AR technology also perceives that he "sees" a robot statue (1110) standing upon the real-world platform (1120), and a cartoon-like avatar character (2) flying by which seems to be a personification of a bumble bee, even though these elements (2, 1110) do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

There, thus, is a need for better localization systems in the context of AR and VR devices.

SUMMARY OF THE INVENTION

According to an embodiment of the present invention, a method of localizing a user operating a plurality of sensing components is provided. The method includes transmitting a first pose data by a control and processing module and receiving the first pose data at a first component. The method also includes transforming the first pose data into a first component relative pose in a coordinate frame based on the control and processing module and updating a display unit in communication with the first component with the first component relative pose.

According to another embodiment of the present invention, a method of localizing a user operating a plurality of sensing components is provided. The method includes receiving environmental characteristics indicating positional information at a head mounted component, determining a head mounted component pose in an environment coordinate frame of the head mounted component based on the received environmental characteristics, and receiving relative positional aspects with respect to the head mounted component of at least one hand held component. The method also includes determining a relative hand held component pose of the at least one hand held component in a head mounted component coordinate frame, sharing the head mounted component pose in the environment coordinate frame with the at least one hand held component and sharing the relative hand held component pose in the head mounted component coordinate frame with the head mounted component, and updating the relative pose of the at least one hand held component in the head mounted coordinate frame.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiment thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings.

DETAILED DESCRIPTION OF THE INVENTION

Figure 1:
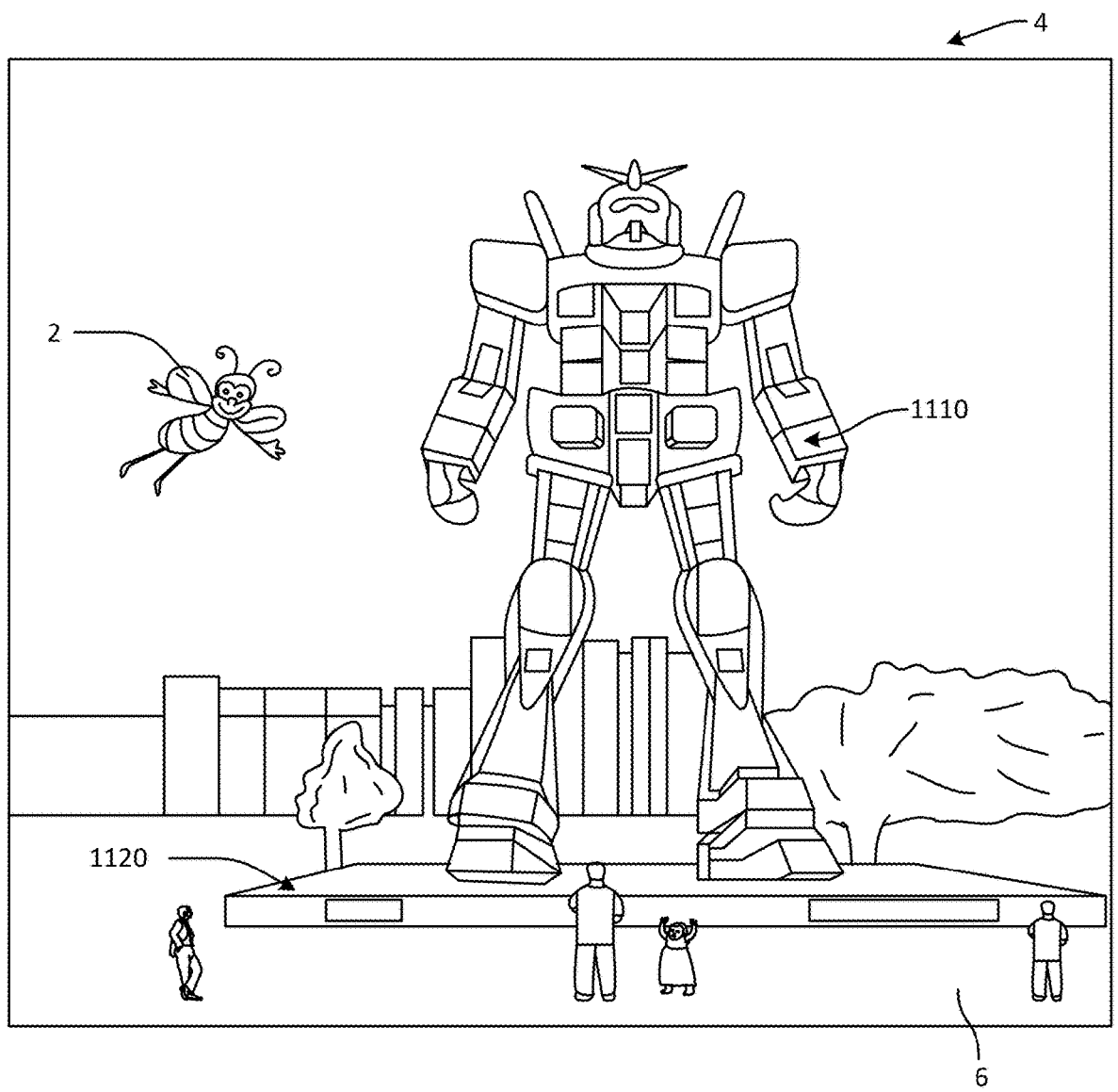
FIG. 1 illustrates a plan view of an AR scene displayed to a user of an AR system according to one embodiment.

For instance, head-worn AR displays (or helmet-mounted displays, or smart glasses) typically are at least loosely coupled to a user's head, and thus move when the user's head moves. If the user's head motions are detected by the display system, the data being displayed can be updated to take the change in head pose into account.

As an example, if a user wearing a head-worn display views a virtual representation of a three-dimensional (3D) object on the display and walks around the area where the 3D object appears, that 3D object can be re-rendered for each viewpoint, giving the user the perception that he or she is walking around an object that occupies real space. If the head-worn display is used to present multiple objects within a virtual space (for instance, a rich virtual world), measurements of head pose (i.e., the location and orientation of the user's head) can be used to re-render the scene to match the user's dynamically changing head location and orientation and provide an increased sense of immersion in the virtual space.

In AR systems, detection or calculation of head pose can facilitate the display system to render virtual objects such that they appear to occupy a space in the real world in a manner that makes sense to the user. In addition, detection of the position and/or orientation of a real object, such as handheld device (which also may be referred to as a "totem"), haptic device, or other real physical object, in relation to the user's head or AR system may also facilitate the display system in presenting display information to the user to enable the user to interact with certain aspects of the AR system efficiently. As the user's head moves around in the real world, the virtual objects may be re-rendered as a function of head pose, such that the virtual objects appear to remain stable relative to the real world. At least for AR applications, placement of virtual objects in spatial relation to physical objects (e.g., presented to appear spatially proximate a physical object in two- or three-dimensions) may be a non-trivial problem. For example, head movement may significantly complicate placement of virtual objects in a view of an ambient environment. Such is true whether the view is captured as an image of the ambient environment and then projected or displayed to the end user, or whether the end user perceives the view of the ambient environment directly. For instance, head movement will likely cause a field of view of the end user to change, which will likely require an update to where various virtual objects are displayed in the field of the view of the end user.

Additionally, head movements may occur within a large variety of ranges and speeds. Head movement speed may vary not only between different head movements, but within or across the range of a single head movement. For instance, head movement speed may initially increase (e.g., linearly or not) from a starting point, and may decrease as an ending point is reached, obtaining a maximum speed somewhere between the starting and ending points of the head movement. Rapid head movements may even exceed the ability of the particular display or projection technology to render images that appear uniform and/or as smooth motion to the end user.

Head tracking accuracy and latency (i.e., the elapsed time between when the user moves his or her head and the time when the image gets updated and displayed to the user) have been challenges for VR and AR systems. Especially for display systems that fill a substantial portion of the user's visual field with virtual elements, it is critical that the accuracy of head-tracking is high and that the overall system latency is very low from the first detection of head motion to the updating of the light that is delivered by the display to the user's visual system. If the latency is high, the system can create a mismatch between the user's vestibular and visual sensory systems, and generate a user perception scenario that can lead to motion sickness or simulator sickness. If the system latency is high, the apparent location of virtual objects will appear unstable during rapid head motions.

In addition to head-worn display systems, other display systems can benefit from accurate and low latency head pose detection. These include head-tracked display systems in which the display is not worn on the user's body, but is, e.g., mounted on a wall or other surface. The head-tracked display acts like a window onto a scene, and as a user moves his head relative to the "window" the scene is re-rendered to match the user's changing viewpoint. Other systems include a head-worn projection system, in which a head-worn display projects light onto the real world.

Additionally, in order to provide a realistic augmented reality experience, AR systems may be designed to be interactive with the user. For example, multiple users may play a ball game with a virtual ball and/or other virtual objects. One user may "catch" the virtual ball, and throw the ball back to another user. In another embodiment, a first user may be provided with a totem (e.g., a real bat communicatively coupled to the AR system) to hit the virtual ball. In other embodiments, a virtual user interface may be presented to the AR user to allow the user to select one of many options. The user may use totems, haptic devices, wearable components, or simply touch the virtual screen to interact with the system.

Detecting head pose and orientation of the user, and detecting a physical location of real objects in space enable the AR system to display virtual content in an effective and enjoyable manner. However, although these capabilities are key to an AR system, but are difficult to achieve. In other words, the AR system must recognize a physical location of a real object (e.g., user's head, totem, haptic device, wearable component, user's hand, etc.) and correlate the physical coordinates of the real object to virtual coordinates corresponding to one or more virtual objects being displayed to the user. This requires highly accurate sensors and sensor recognition systems that track a position and orientation of one or more objects at rapid rates. Current approaches do not perform localization at satisfactory speed or precision standards.

Referring to FIGS. 2A-2D, some general componentry options are illustrated. In the portions of the detailed description which follow the discussion of FIGS. 2A-2D, various systems, subsystems, and components are presented for addressing the objectives of providing a high-quality, comfortably-perceived display system for human VR and/or AR.

Figure 2A:
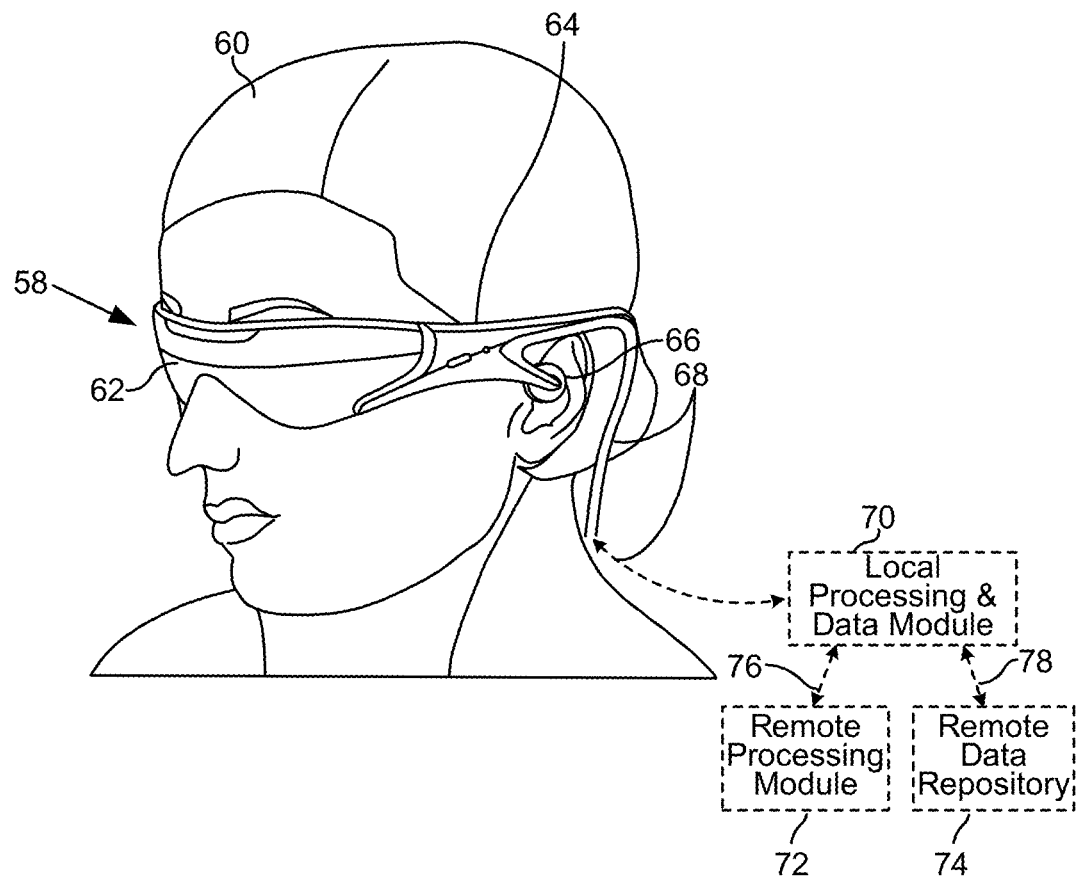
FIGS. 2A-2D illustrate various embodiments of wearable AR devices.
Figure 2B:
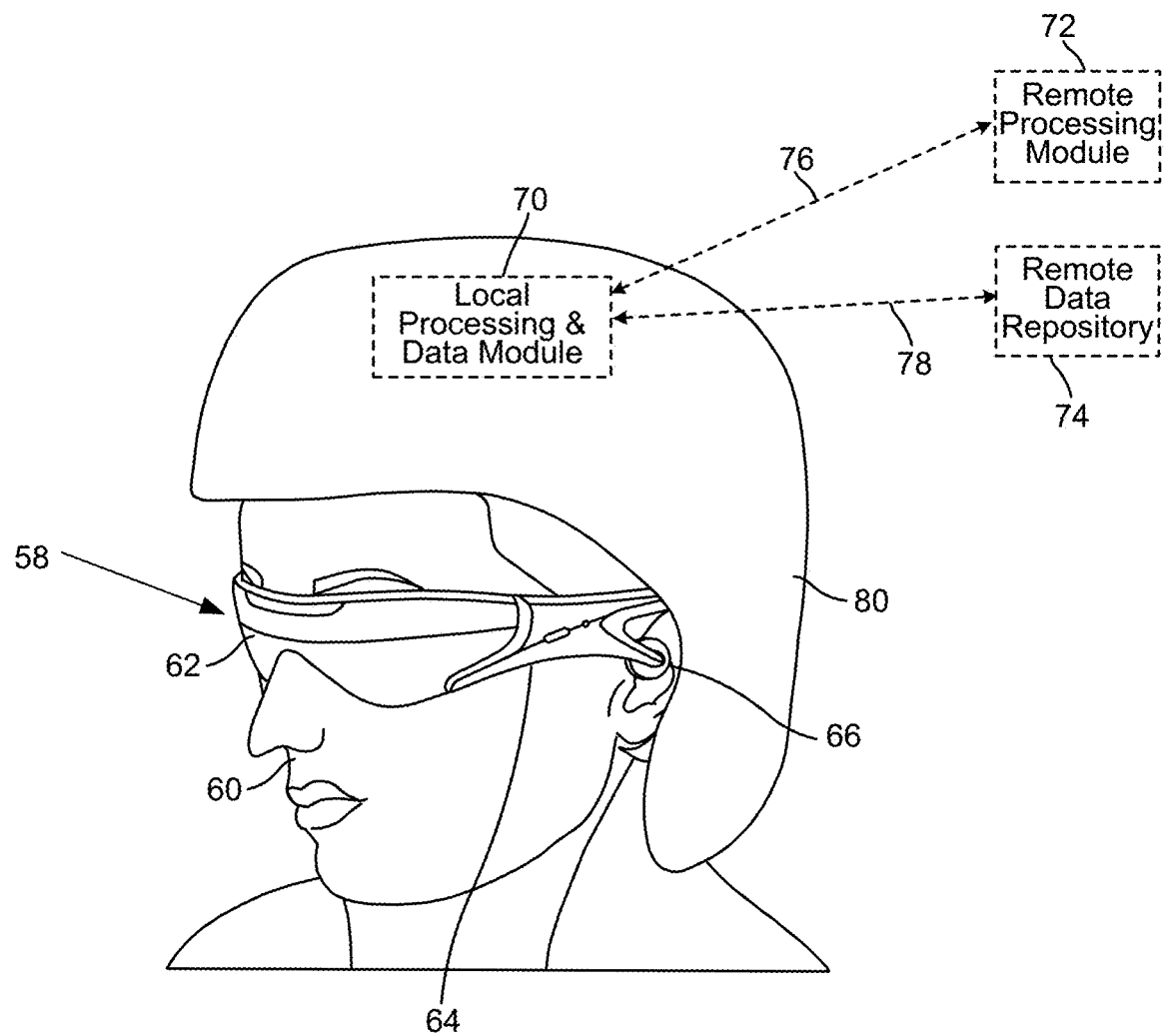
Figure 2C:
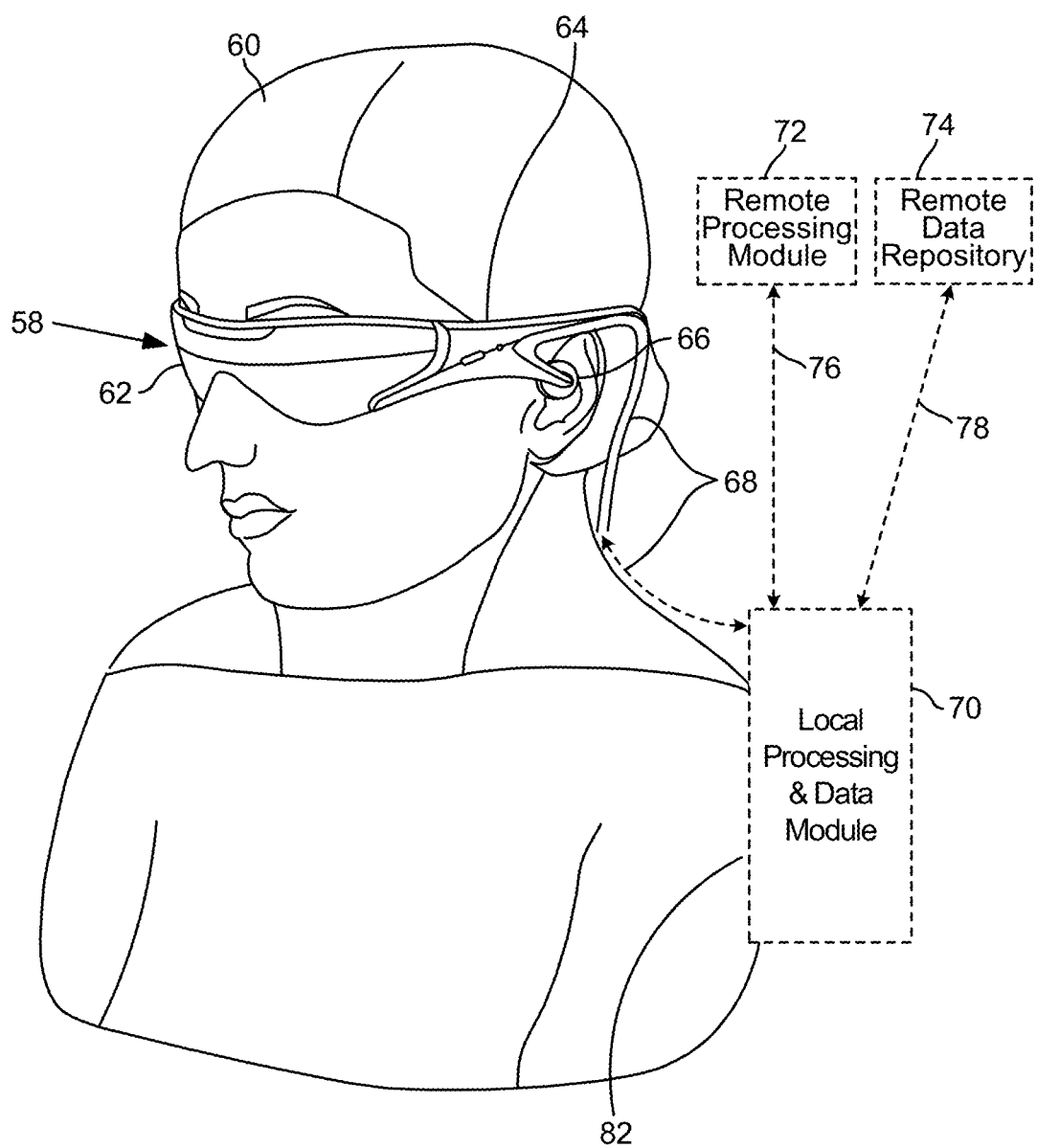
Figure 2D:
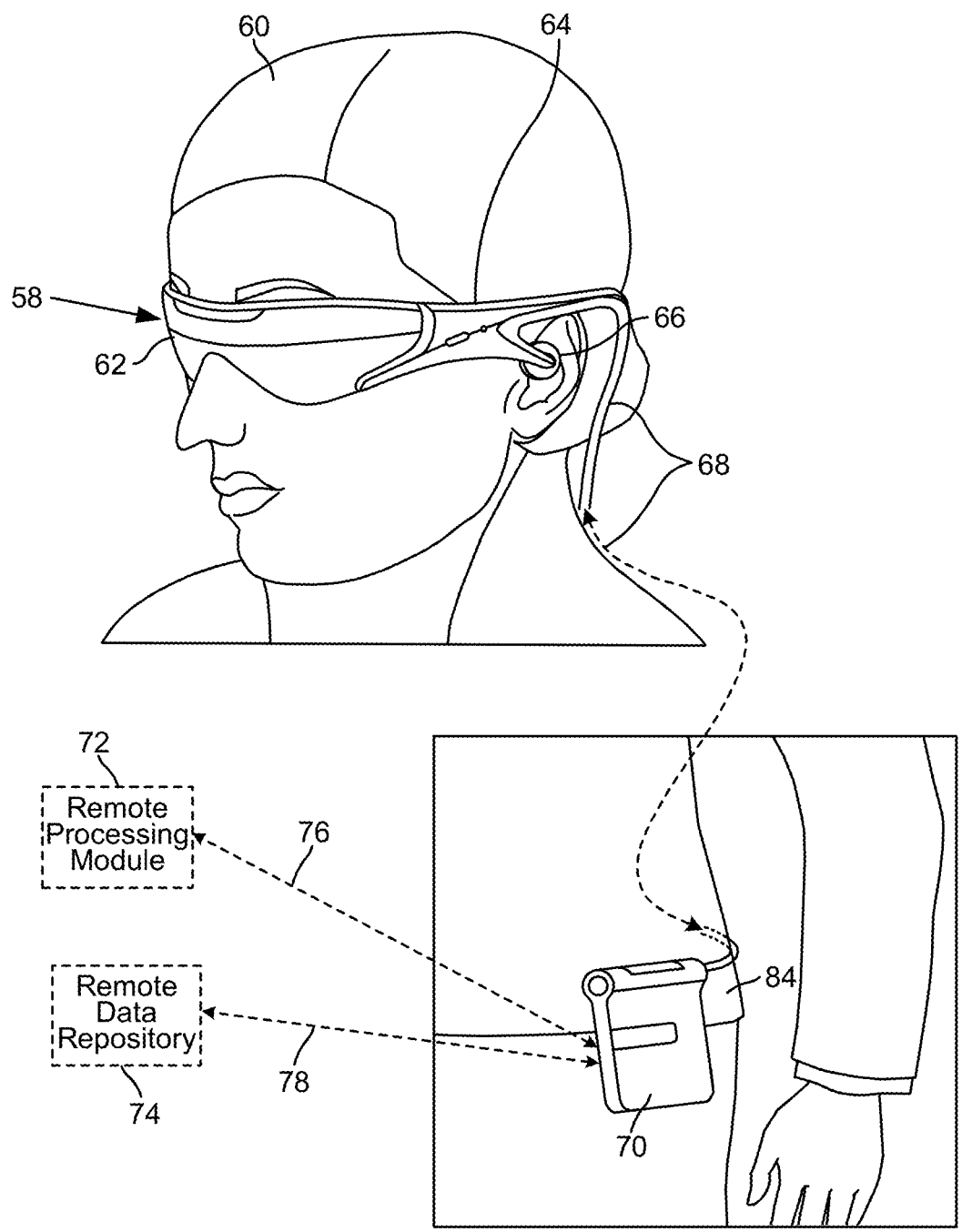

As shown in FIG. 2A, an AR system user (60) is depicted wearing head mounted component (58) featuring a frame (64) structure coupled to a display system (62) positioned in front of the eyes of the user. A speaker (66) is coupled to the frame (64) in the depicted configuration and positioned adjacent the ear canal of the user (in one embodiment, another speaker, not shown, is positioned adjacent the other ear canal of the user to provide for stereo/shapeable sound control). The display (62) is operatively coupled (68), such as by a wired lead or wireless connectivity, to a local processing and data module (70) which may be mounted in a variety of configurations, such as fixedly attached to the frame (64), fixedly attached to a helmet or hat (80) as shown in the embodiment of FIG. 2B, embedded in headphones, removably attached to the torso (82) of the user (60) in a backpack-style configuration as shown in the embodiment of FIG. 2C, or removably attached to the hip (84) of the user (60) in a belt-coupling style configuration as shown in the embodiment of FIG. 2D.

The local processing and data module (70) may comprise a power-efficient processor or controller, as well as digital memory, such as flash memory, both of which may be utilized to assist in the processing, caching, and storage of data a) captured from sensors which may be operatively coupled to the frame (64), such as image capture devices (such as cameras), infrared IR emitters and receivers, microphones, inertial measurement units, accelerometers, compasses, GPS units, radio devices, and/or gyros; and/orb) acquired and/or processed using the remote processing module (72) and/or remote data repository (74), possibly for passage to the display (62) after such processing or retrieval. The local processing and data module (70) may be operatively coupled (76, 78), such as via a wired or wireless communication links, to the remote processing module (72) and remote data repository (74) such that these remote modules (72, 74) are operatively coupled to each other and available as resources to the local processing and data module (70).

In one embodiment, the remote processing module (72) may comprise one or more relatively powerful processors or controllers configured to analyze and process data and/or image information. In one embodiment, the remote data repository (74) may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Figure 3:
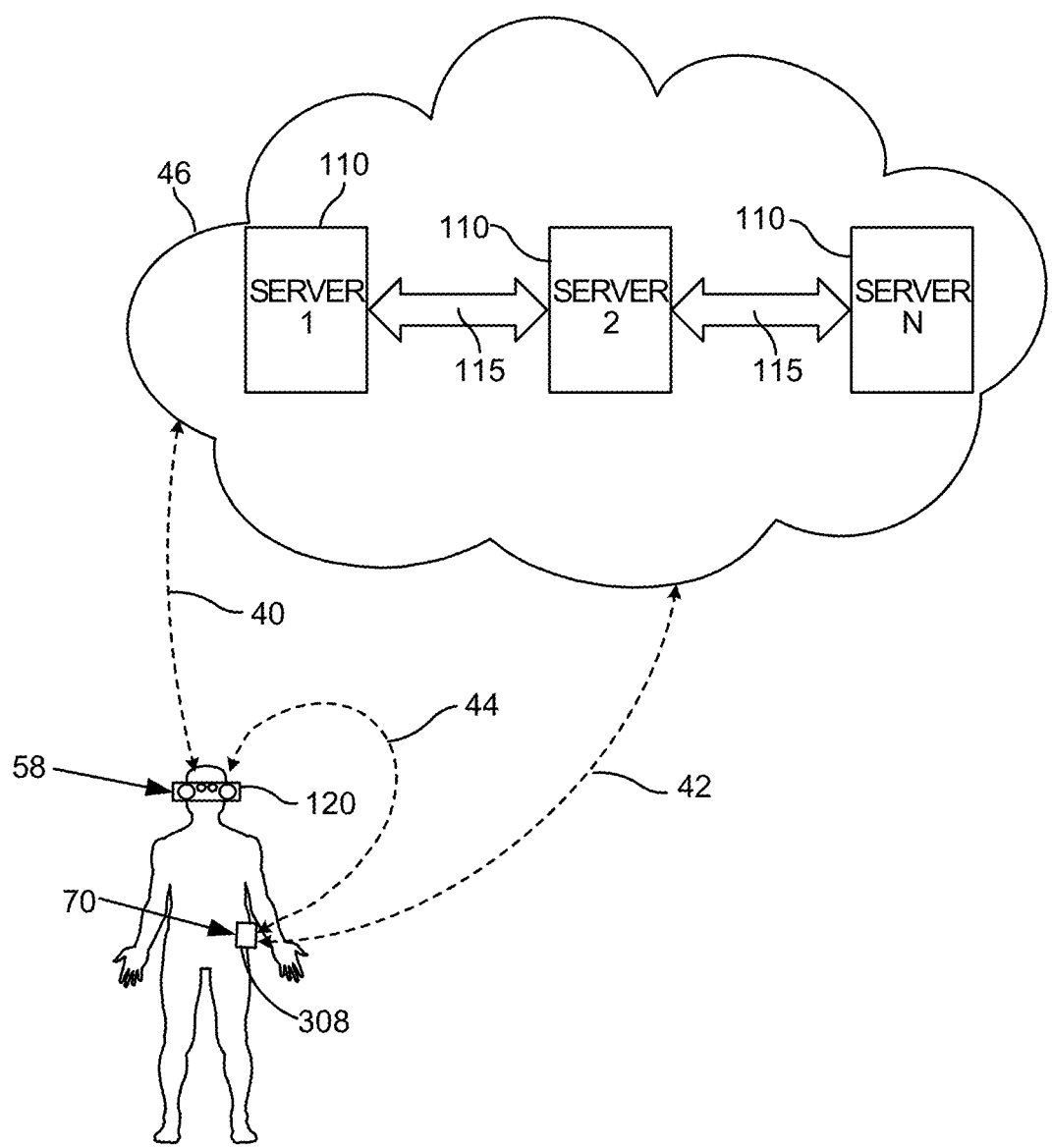
FIG. 3 illustrates an example embodiment of a wearable AR device interacting with one or more cloud servers of the system in accordance with embodiments of the present invention.

Referring now to FIG. 3, a schematic illustrates coordination between the cloud computing assets (46) and local processing assets, which may, for example reside in head mounted componentry (58) coupled to the user's head (120) and a local processing and data module (70), coupled to the user's belt (308; therefore the component 70 may also be termed a "belt pack" 70), as shown in FIG. 3. In one embodiment, the cloud (46) assets, such as one or more server systems (110) are operatively coupled (115), such as via wired or wireless networking (wireless being preferred for mobility, wired being preferred for certain high-bandwidth or high-data-volume transfers that may be desired), directly to (40, 42) one or both of the local computing assets, such as processor and memory configurations, coupled to the user's head (120) and belt (308) as described above. These computing assets local to the user may be operatively coupled to each other as well, via wired and/or wireless connectivity configurations (44), such as the wired coupling (68) discussed below in reference to FIG. 8 In one embodiment, to maintain a low-inertia and small-size subsystem mounted to the user's head (120), primary transfer between the user and the cloud (46) may be via the link between the subsystem mounted at the belt (308) and the cloud, with the head mounted (120) subsystem primarily data-tethered to the belt-based (308) subsystem using wireless connectivity, such as ultra-wideband ("UWB") connectivity, as is currently employed, for example, in personal computing peripheral connectivity applications.

With efficient local and remote processing coordination, and an appropriate display device for a user, such as the user interface or user display system (62) shown in FIG. 2A, or variations thereof, aspects of one world pertinent to a user's current actual or virtual location may be transferred or "passed" to the user and updated in an efficient fashion. In other words, a map of the world may be continually updated at a storage location which may partially reside on the user's AR system and partially reside in the cloud resources.

The map (also referred to as a "passable world model") may be a large database comprising raster imagery, 3-D and 2-D points, parametric information and other information about the real world. As more and more AR users continually capture information about their real environment (e.g., through cameras, sensors, inertial motion units (IMUs), etc.), the map becomes more and more accurate and complete.

With a configuration as described above, wherein there is one world model that can reside on cloud computing resources and be distributed from there, such world can be "passable" to one or more users in a relatively low bandwidth form preferable to trying to pass around real-time video data or the like. The augmented experience of the person standing near the statue (i.e., as shown in FIG. 1) may be informed by the cloud-based world model, a subset of which may be passed down to them and their local display device to complete the view. A person sitting at a remote display device, which may be as simple as a personal computer sitting on a desk, can efficiently download that same section of information from the cloud and have it rendered on their display. Indeed, one person actually present in the park near the statue may take a remotely-located friend for a walk in that park, with the friend joining through virtual and augmented reality. The system will need to know where the street is, wherein the trees are, where the statue is but with that information on the cloud, the joining friend can download from the cloud aspects of the scenario, and then start walking along as an augmented reality local relative to the person who is actually in the park.

Features, or 3-D points otherwise, may be detected and captured or otherwise extracted from the environment, and the pose (i.e., vector and/or origin position information relative to the world) of the cameras that capture those images or points may be determined, so that these points or images may be "tagged", or associated, with this pose information. Then points captured by a second camera (either second camera physically, or the same camera but at a second moment in time) may be utilized to determine the pose of the second camera. In other words, one can orient and/or localize a second camera based upon comparisons with tagged images from a first camera. Then this knowledge may be utilized to extract textures, make maps, and create a virtual copy of the real world (for example, there are two cameras around that are registered, or two moments in time that can be used to compare commonly registered data).

So at the base level, in one embodiment a person-worn system can be utilized to capture both 3-D points and the 2-D images that produced the points, and these points and images may be sent out to a cloud storage and processing resource. They may also be cached locally with embedded pose information (i.e., cache the tagged images); so the cloud may have on the ready (i.e., in available cache) tagged 2-D images (i.e., tagged with a 3-D pose), along with 3-D points. If a user is observing something dynamic, he may also send additional information up to the cloud pertinent to the motion (for example, if looking at another person's face, the user can take a texture map of the face and push that up at an optimized frequency even though the surrounding world is otherwise basically static).

In order to capture points that can be used to create the "passable world model," it is helpful to accurately know the user's location, pose and orientation with respect to the world. More particularly, the user's position must be localized to a granular degree, because it may be important to know the user's head pose, as well as hand pose (if the user is clutching a handheld component, gesturing, etc.). In one or more embodiments, GPS and other localization information may be utilized as inputs to such processing. Highly accurate localization of the user's head, totems, hand gestures, haptic devices etc. are crucial in displaying appropriate virtual content to the user.

Figure 4:
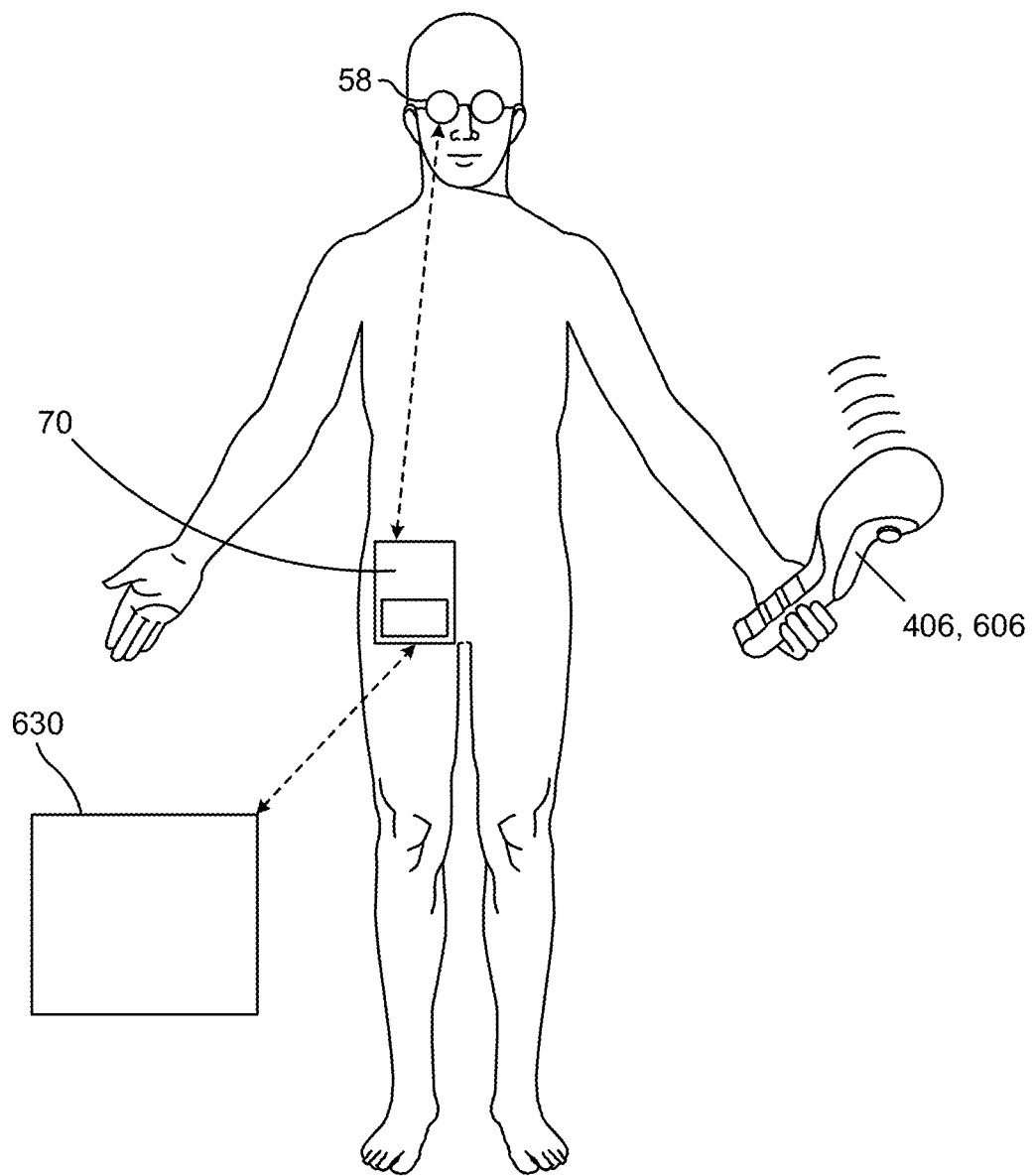
FIG. 4 illustrates an example embodiment of a wearable AR device interacting with one or more hand held controller devices in accordance with embodiments of the present invention.

Referring to FIG. 4, an AR system is shown featuring an operatively coupled hand-held controller (606). In one or more embodiments, the hand-held controller may be referred to as a "totem" to be utilized in various user scenarios, such as gaming. In other embodiments, the hand-held controller may be a haptic device. The hand-held controller (606) may comprise a battery or other power supply to power the various interconnected components, which may comprise cameras, IMUs and other devices, as described below. The local processing and data module (70) may be operatively coupled to cloud resources (630), and operatively coupled to the head mounted wearable component (58), as described herein.

In various embodiments, it may be desirable to aggregate the computing, perception power, and perception capabilities of various components to, for example, have an enhanced understanding of various issues pertaining to the user's operation in the local space, such as where the components are located and/or oriented relative to each other in space, what type of local environment (for example, room geometry, position and/or orientation of objects within the room, etc.) the user is dealing with, and/or what objects and characteristics may be mapped (for example, using SLAM analysis).

Figure 5:
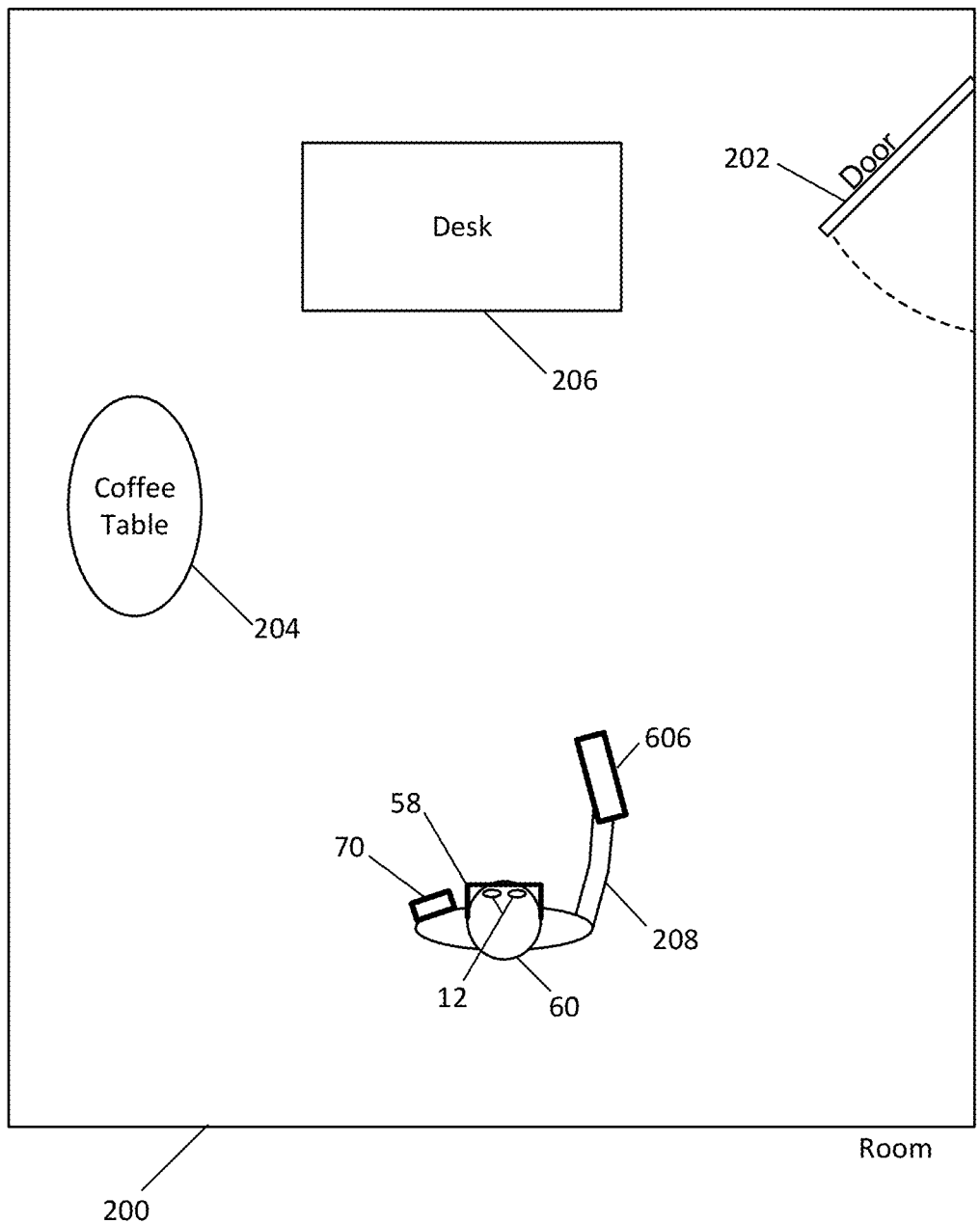
FIG. 5 illustrates an example of a user operating a localization protocol in a physical environment in accordance with embodiments of the present invention.

Referring to FIG. 5, a top view of a room (200) is shown with a user (60) standing looking generally toward a desk (206), coffee table (204), and door (202) which is configured to swing open into the room when utilized. As described above, in various embodiments, a wearable computing system comprising operatively coupled components such as a head mounted component (58), a local processing and data module (70), and a hand held component (606). Also as described above, each of such components may comprise various sensors and processors and related capabilities of their own—such as camera, IMU, and processor components, which may be configured to, amongst other things, provide data to pose determination algorithms utilized by one or more processors to determine where such components are relative to each other and/or relative to aspects of the environment around them in position and/or orientation (so called "pose" determination, as described above).

Referring again to FIG. 5, in one embodiment, the relative proximity of the hand held component (606) and local processing and data module (70) to the head mounted component (58) may be advantageous in terms of determining the positioning and/or orientation of such components relative to each other, but it may not be optimized to gather information regarding the environment around the person and such components. For example, in some positions and orientations, the user's own body may occlude or otherwise interfere with the hand held component (606) and preclude efficiently communicating with the head mounted component (58). Other non-user environmental factors may impact performance as well, for example, the door (202) of FIG. 5, which may change position and/or orientation relative to the components (58, 70, and/or 606) due to its movable nature as functional door, is almost entirely across the room from the operator (60) in the depicted configuration. The distance and angular motion of such a structure may not be easily detectable by either hand held component (606) or head mounted component (58).

Figure 6A:
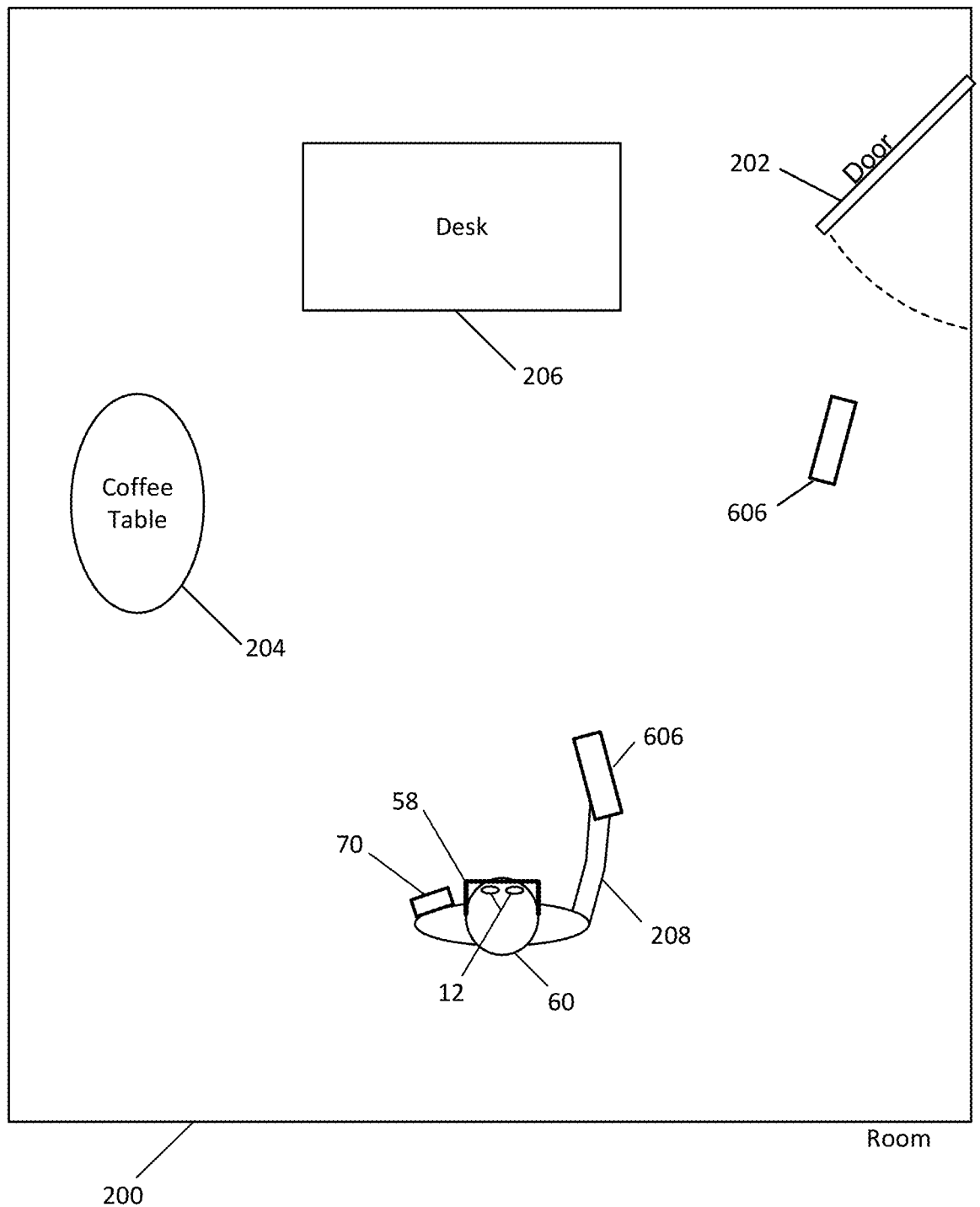
FIGS. 6A-6C illustrate an example of a user operating a localization protocol in a physical environment with one or more support modules in accordance with embodiments of the present invention.
Figure 6B:
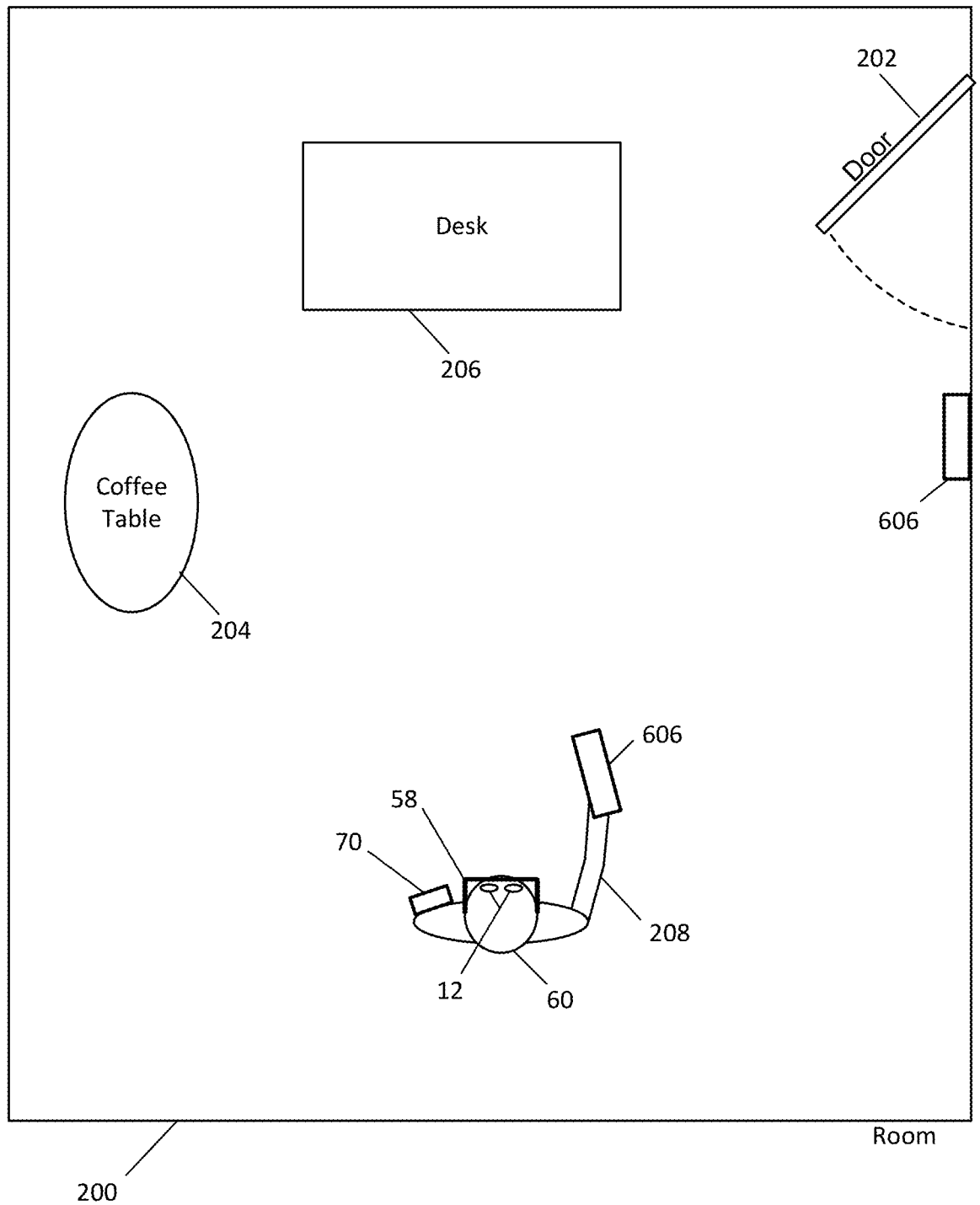

Referring to FIG. 6A, in various embodiments, it may be desirable to place one or more instrumented components, such as an additional hand held component module (606) which may be wirelessly interconnected, such as via Bluetooth or other wireless connectivity modality as described above, to the processing and storage resources of the other components (58, 70, and/or 606) coupled to the operator (60), in a location and orientation believed to be of interest—such as a position near the door (202) with instrumentation oriented toward such door. In other words, the additional hand held component module (606) may be placed in a position wherein it is not actually held in the hand of the user, but rather positioned and oriented relative to the room or other objects (i.e., by placement on a desk, floor, or other object, held by a mount coupled to another object, removably and/or fixedly attached to another object, etc.); in such configurations, the additional hand held component module (606) may be termed a "support" or "capture and processing" module (606). In one embodiment, a capture and processing module (606) as shown in FIG. 6A may be placed in a temporary position/orientation configuration on the floor or some other structure, or may be fixedly attached to a structure, as shown in the embodiment of FIG. 6B, wherein an additional capture and processing module (606) is coupled to a wall, again in a position and orientation selected to assist with gathering of data pertinent to the nearby door (202), and again with the additional capture and processing module (606) being operatively coupled, such as via Bluetooth or other wireless connectivity configuration, such as those described above, to the other components (58, 70, 606) of the subject system.

Figure 6C:
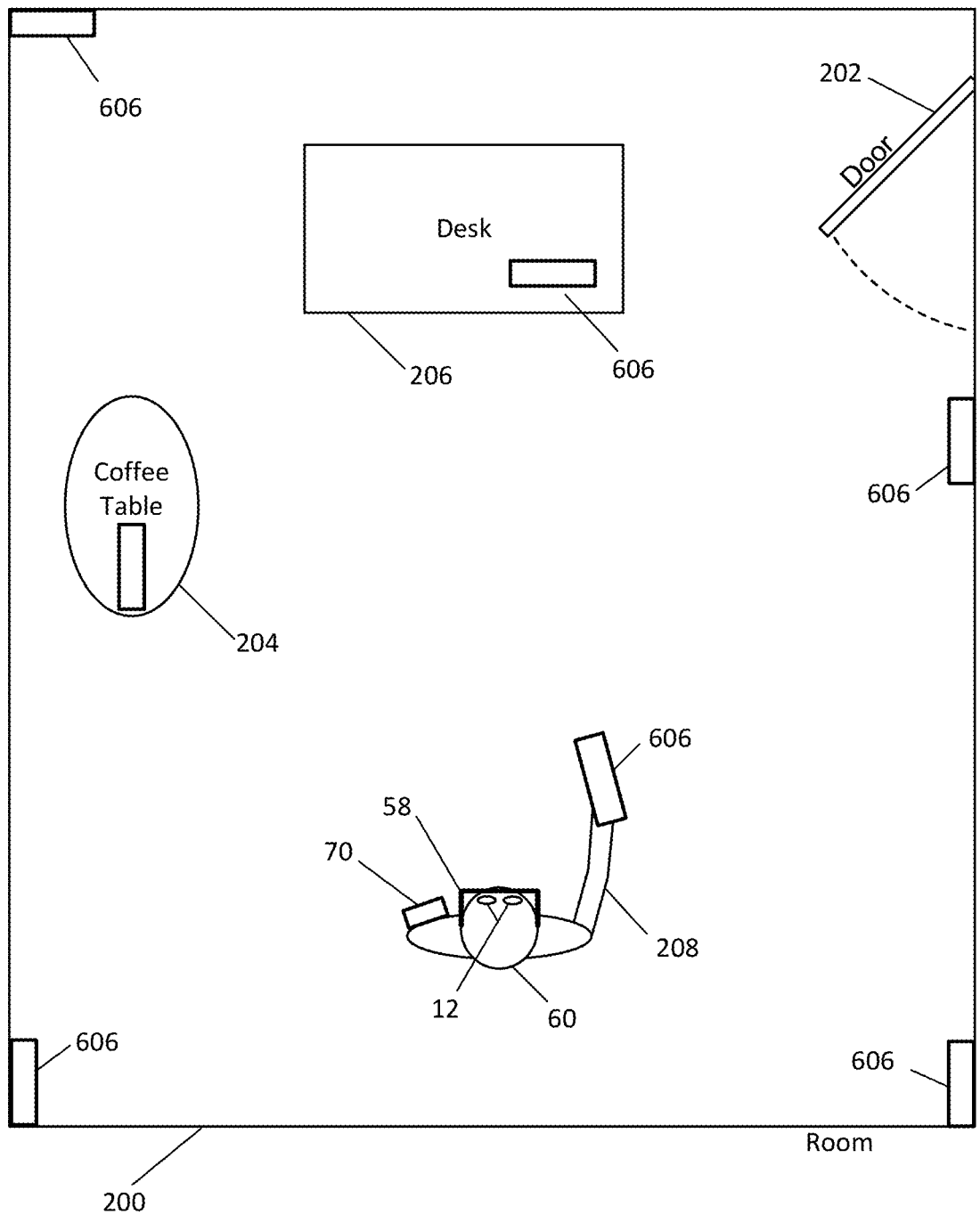

With such an embodiment, each component physically coupled (58, 70, 606) to the operator (60) may be configured to benefit from additional data capture and processing capabilities resident within the additional capture and processing module (606), here shown as an additional version of the componentry utilized as the hand held component. FIG. 6C illustrates that a plurality of additional capture and processing modules (606) may be positioned and oriented around the operator's environment to assist in processing and analyzing the world around them. It will be appreciated that the plurality of capture and processing modules may be individually optimized for different measurements. For example, a capture and processing module (606) proximate a door may be configured to update localization data for a system utilized by user (60) only when door (202) opens and closes. Whereas a ray cast or cone cast from a sensor on head mounted component (58) or hand held component (606) from a distance may not be able to tell the difference between a semi-open door and a closed door, a sensor proximate to the door with a time of flight sensor oriented in the angular direction of the door opening and closing can determine the door (202) (and by extension the room (200)) updated detectable feature positions faster and more precisely.

Similarly, a capture and processing module (606) in a corner of room (200) may activate and provide localization data when it detects user (60) is proximate to it and has a head pose directs at least partially towards the corner capture and processing module (606). The benefit of such embodiment being that as a user approaches the physical limit of a space, such as a wall or corner, there are fewer features for sensors on a head mounted component (50) or hand held component (606) to detect and extract for localization, and a capture and processing module (606) could provide a "lighthouse" effect for localization.

Figure 7A:
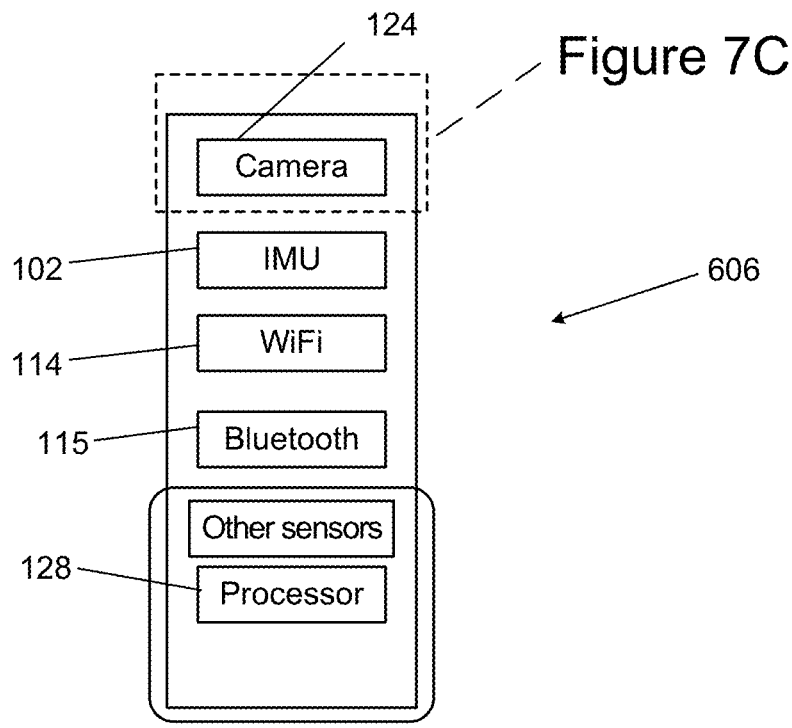
FIGS. 7A-7C illustrate examples of support modules in accordance with embodiments of the present invention.
Figure 7B:
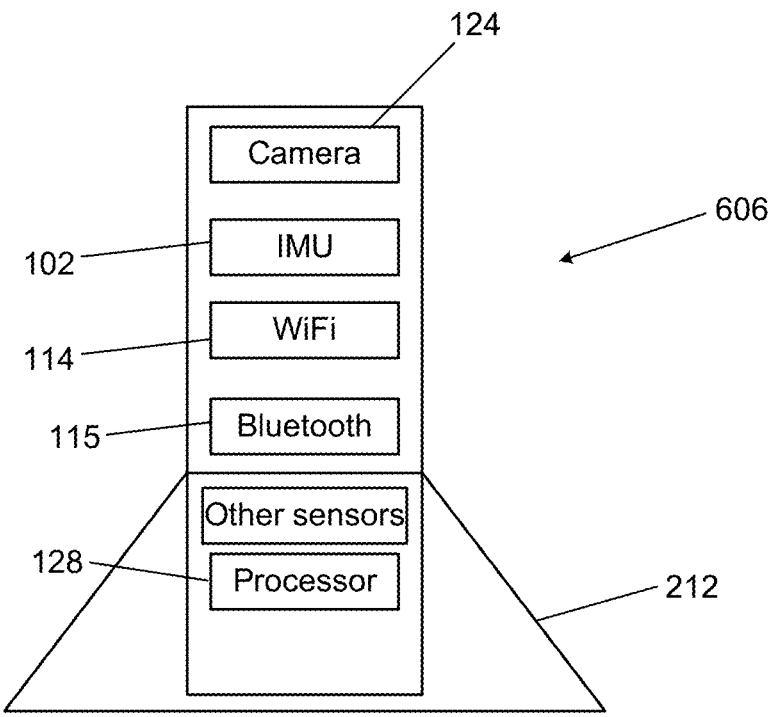
Figure 7C:
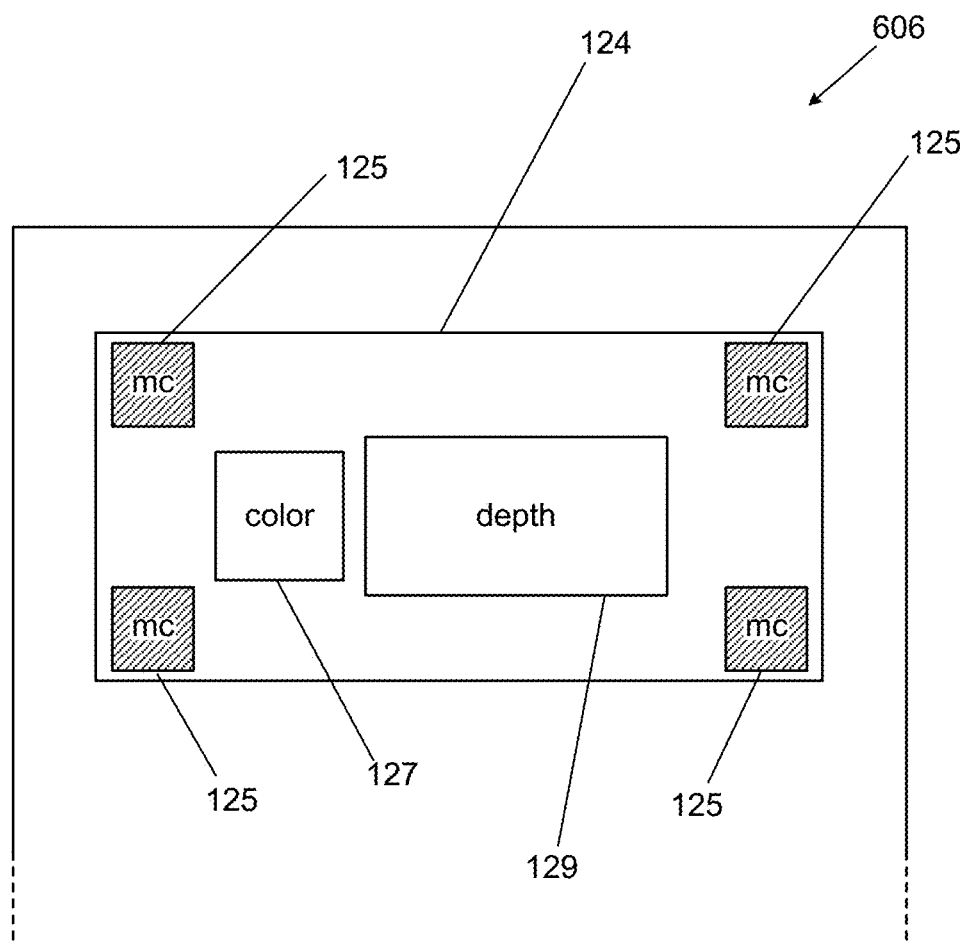

FIGS. 7A and 7B illustrate embodiments of portable additional capture and processing modules (606) which may comprise handles (210), desktop stands (212), and componentry such as described above, including but not limited to cameras (124), IR emitters and/or receivers, IMUS (102), WiFi communication devices (114), Bluetooth communication devices (115), and embedded and/or mobile processors (128) coupled to other sensors as appropriate. FIG. 7C illustrates a close up view of one embodiment of a camera module (124) which comprises a plurality of monochrome camera devices (125), such as four as shown, a color camera (127), and a depth camera (129) configured to utilize time of flight data to assist in placing image elements in space relative to the capturing interface of such depth camera (129).

Figure 8A:
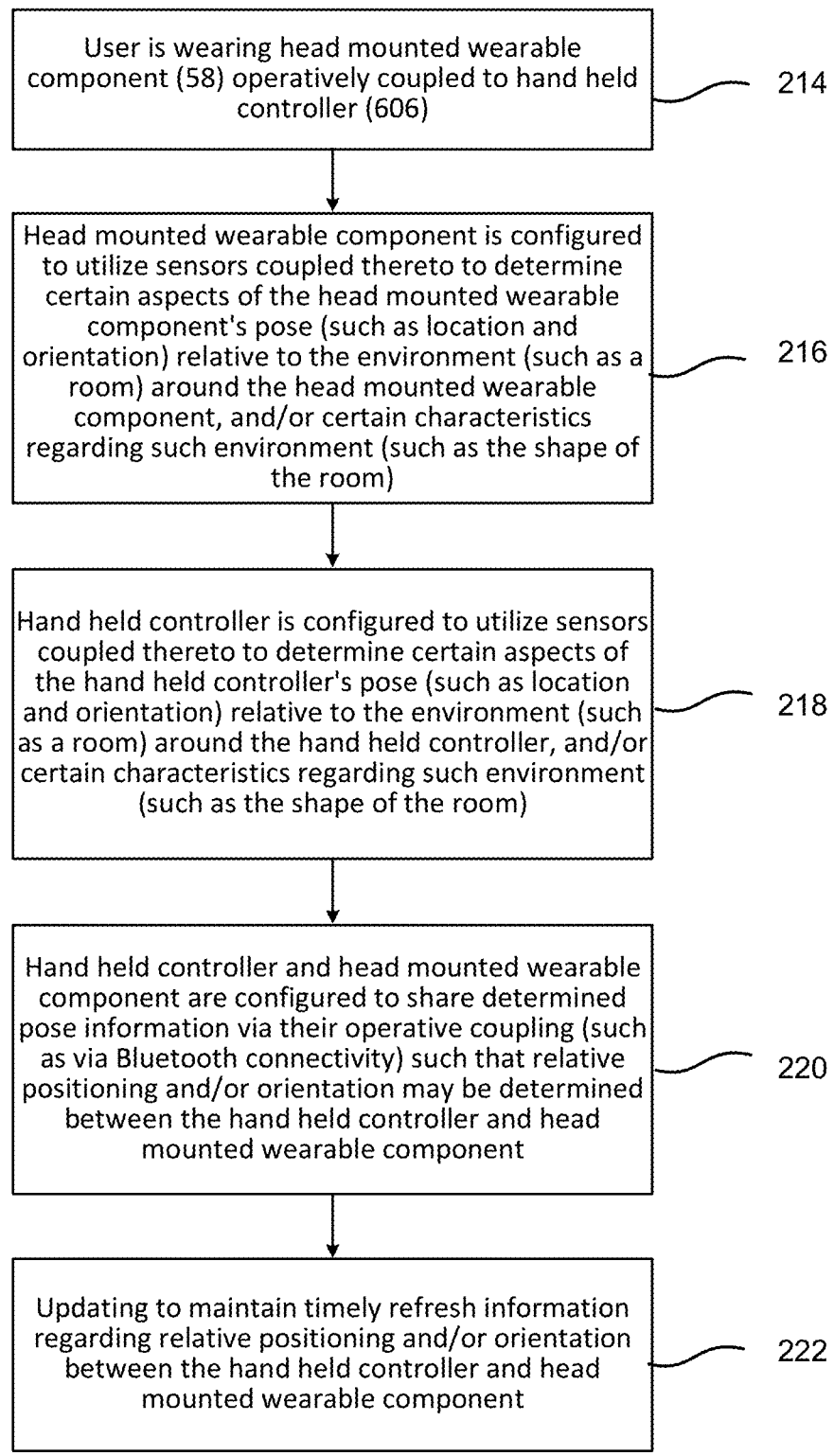
FIGS. 8A-8B illustrate examples of configurations of utilizing embodiments of the present invention.

Referring to FIG. 8A, a configuration such as that featured in FIGS. 5 and 7A-7C may be utilized in determining relative pose of various components. The user may be wearing a head mounted wearable component (58) operatively coupled to a hand held controller (606) that also is coupled to the operator, such as via the operators hand (214). The head mounted wearable component (58) may be configured to utilize sensors coupled thereto to determine certain aspects of the head mounted wearable component's pose, such as location and/or orientation, relative to the environment, such as a room and elements thereof, around the head mounted wearable component (58), and/or certain characteristics regarding such environment, such as the shape of the room or objects there (216).

The hand held controller (606) may be configured to utilize sensors coupled thereto to determine certain aspects of the hand held controller's (606) pose, such as location and/or orientation, relative to the environment around the hand held controller (606), and/or certain characteristics regarding such environment (such as the shape of the room) (218).

The hand held controller and head mounted wearable component may be configured to share determined pose information via their operative couplings (such as via Bluetooth connectivity as described above) such that relative positioning and/or orientation may be determined between the hand held controller and head mounted wearable component (220). Such operations may be updated frequently to maintain timely refresh information regarding relative positioning and/or orientation between the hand held controller and head mounted wearable component (222). The localization of either component may be provided as a function of either's coordinate frame. In other words, the hand held component may operate its sensors to determine its position and orientation in a "hand held component framework" or "coordinate frame" and then couple with the head mounted component to determine the relative position of the head mounted component to provide it with its position and orientation in the same framework. The opposite is also true, that a head mounted component could determine its position and orientation and then determine the position and orientation of the controller relative to the head mounted component, and in turn provide a localization for the hand held component in a head mounted component framework or head mounted coordinate frame. Matrix transformations between the two, such as a Euclidean distance matrix, quaternion orientations, or three dimensional rotation matrices, may be employed to facilitate such coordinate frame transforms between components.

In some embodiments, any one component may localize itself relative to a plurality of other components. For example, a hand held controller (606) may detect its position relative to the head mounted component (58) and a capture and processing module (606). The means of relative sensing may further be subjective. The hand component (606) may utilize IR array tracking to detect an IR signal on head mounted component (58) and use visible light tracking (such as feature detection and extraction or fiducial detection) to detect a capture and processing module (606). In such respects, translation or rotation measurements as between one pairing of components may replace or supplement image capture feature detections as between other pairings of components to provide the user with an optimized localization data set at any given time.

Referring to an earlier example, if a user were to approach an empty wall void of many detectable features, using image based tracking would decrease in accuracy or increase in latency as the system would have fewer sensed feature to utilize to make a calculate. If, however, a control and processing module (606) provided additional detectable data, such as an IR signal, time of flight pulse or electromagnetic transmission, then the user's rotation and translation relative to that control and processing module could at least supplement any localization logic to compensate for the deficiency of a lack of detectable features by the image based tracking sensors.

Figure 8B:
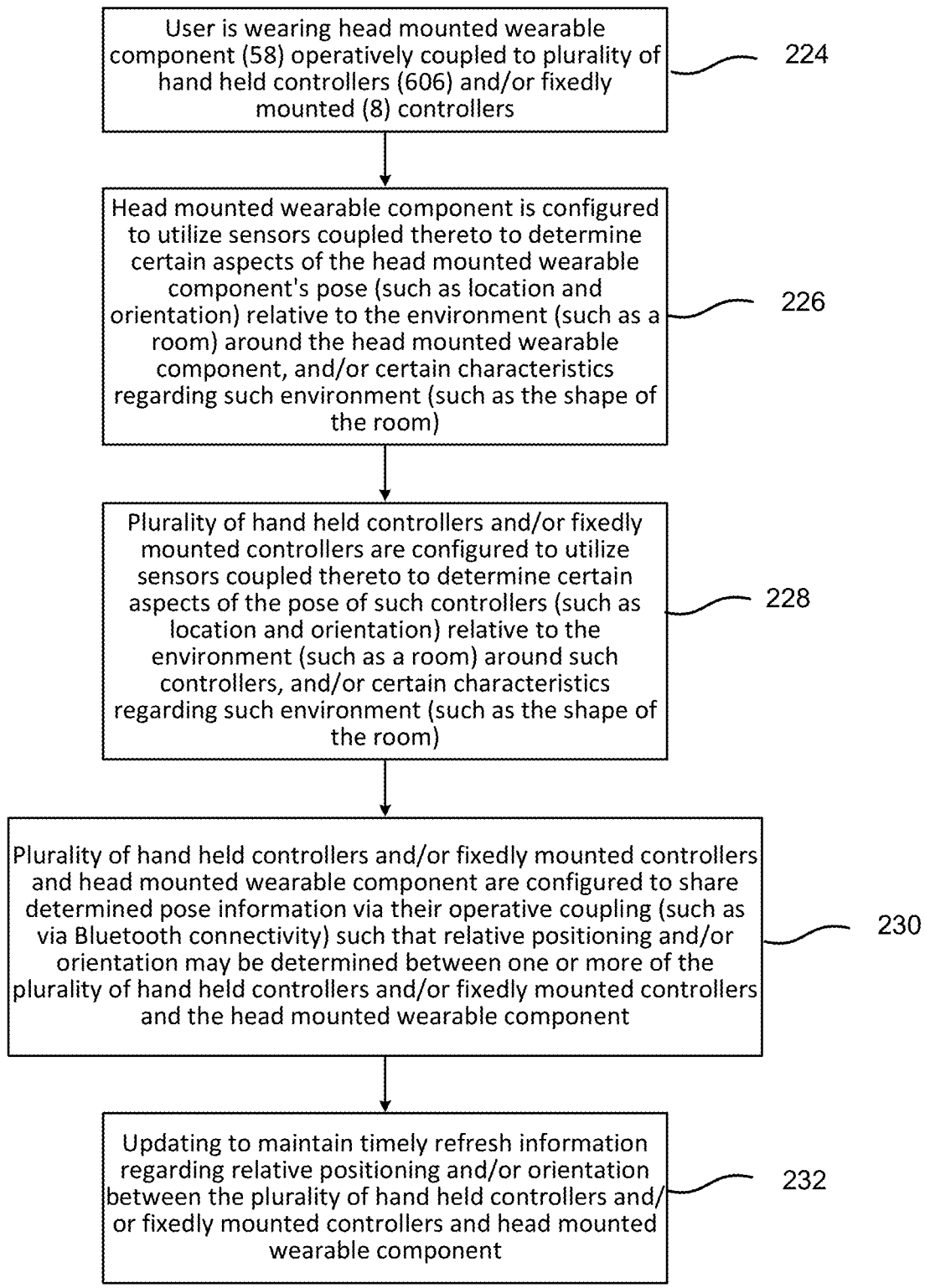

Referring to FIG. 8B, a configuration such as those described above in reference to FIGS. 6A-6C and 7A-7C may be utilized in determining relative, or absolute, pose of various components. As shown in FIG. 8B, a user may be wearing a head mounted wearable component (58) operatively coupled to plurality of hand held controllers (606) and/or fixedly mounted (8) controllers (224), one of which may be physically coupled to the operator's body, such as via a hand held coupling. A head mounted wearable component (58) may be configured to utilize sensors coupled thereto to determine certain aspects of the head mounted wearable component's pose (such as location and orientation) relative to the environment (such as a room) around the head mounted wearable component (58), and/or certain characteristics regarding such environment (such as the shape of the room) (226). A plurality of hand held controllers (606), which may be configured to rest upon other objects or be fixedly mounted thereto, one of which may be physically coupled to the operator, such as in FIGS. 6A-6C and 7A-7C, may be configured to utilize sensors coupled thereto to determine certain aspects of the pose of such controllers (such as location and orientation) relative to the environment (such as a room) around such controllers, and/or certain characteristics regarding such environment (such as the shape of the room) (228). The plurality of hand held controllers (606), which may be fixedly mounted to other objects, resting thereupon, or coupled to the operator, and the head mounted wearable component (58), may be configured to share determined pose information via their operative couplings (such as via Bluetooth connectivity) such that relative positioning and/or orientation may be determined between one or more of the plurality of hand held controllers (606) and the head mounted wearable component (58) (230).

Matrix transformations among each of the components may be optimized to provide an absolute position, if not simply a relative position among the components. For example, if the positions and orientations of the fixedly mounted components is known with the physical environment, then hand held component (606) or head mounted component (58) may determine their respective poses relative to those fixedly mounted components and by extension determine a "real world coordinate frame" or "environment coordinate frame" position and orientation, which may be referred to absolute pose.

It will be appreciated other intermediate coordinate frames may exist or be useful, as discussed above. For example, a hand held controller that only receives positional data (such as from an inertial measurement unit, accelerometer, or cameras coupled to the hand held component) may determine its pose in a "hand held coordinate frame" and similarly for a "head mounted coordinate frame" and pose information its sensors detect and extract. In some embodiments, a localization system and protocol for determining the position of using the disclosed sensors and sensing components may only need to operate in an intermediate coordinate frame, and not need absolute or full environment coordinate frame information.

Such operations may be updated frequently to maintain timely information regarding relative positioning and/or orientation between the plurality of hand held controllers and/or fixedly mounted controllers and head mounted wearable component (232).

Figure 9A:
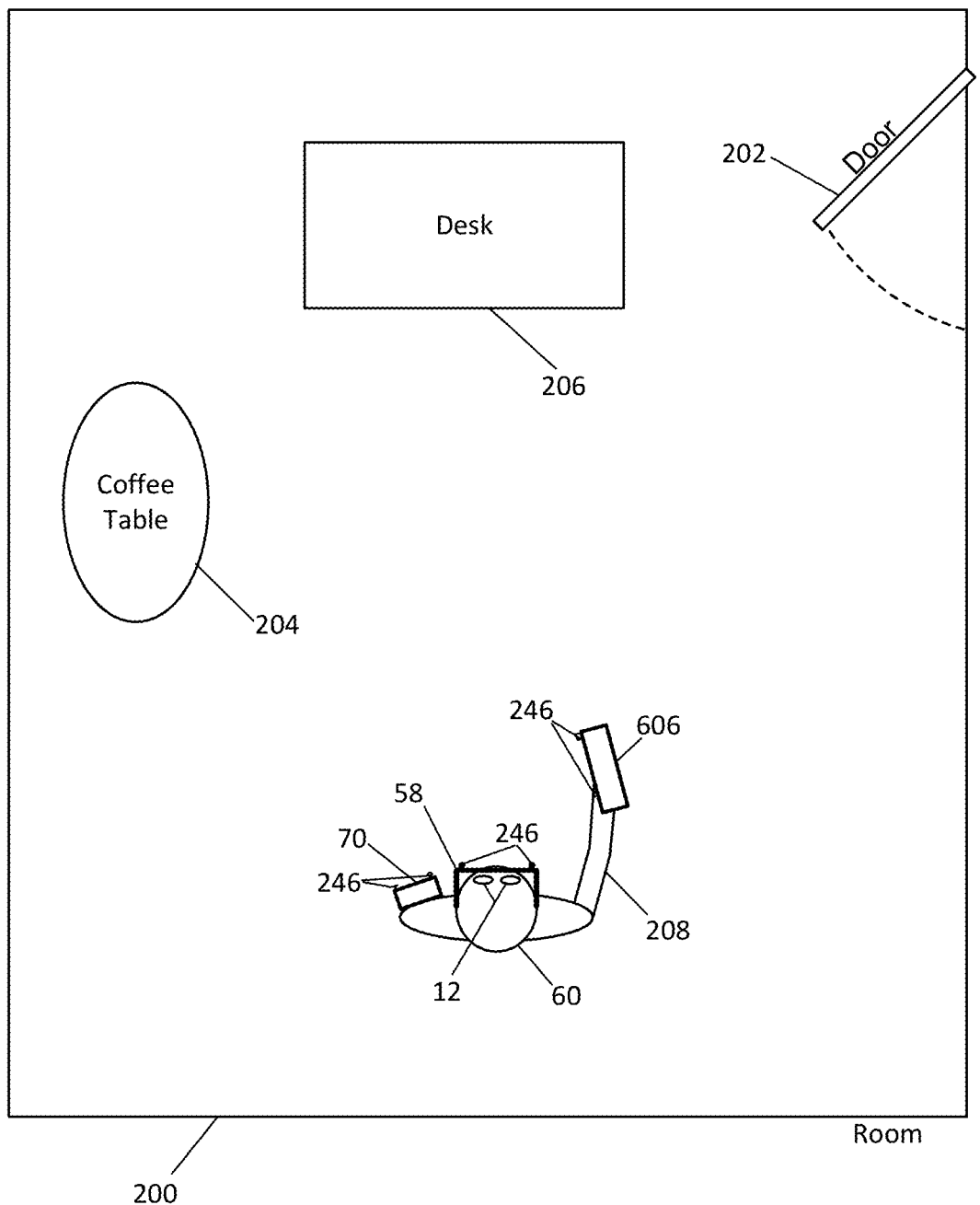
FIGS. 9A-9I illustrate examples of coupling means for wearable AR systems and support modules in accordance with embodiments of the present invention.
Figure 9B:
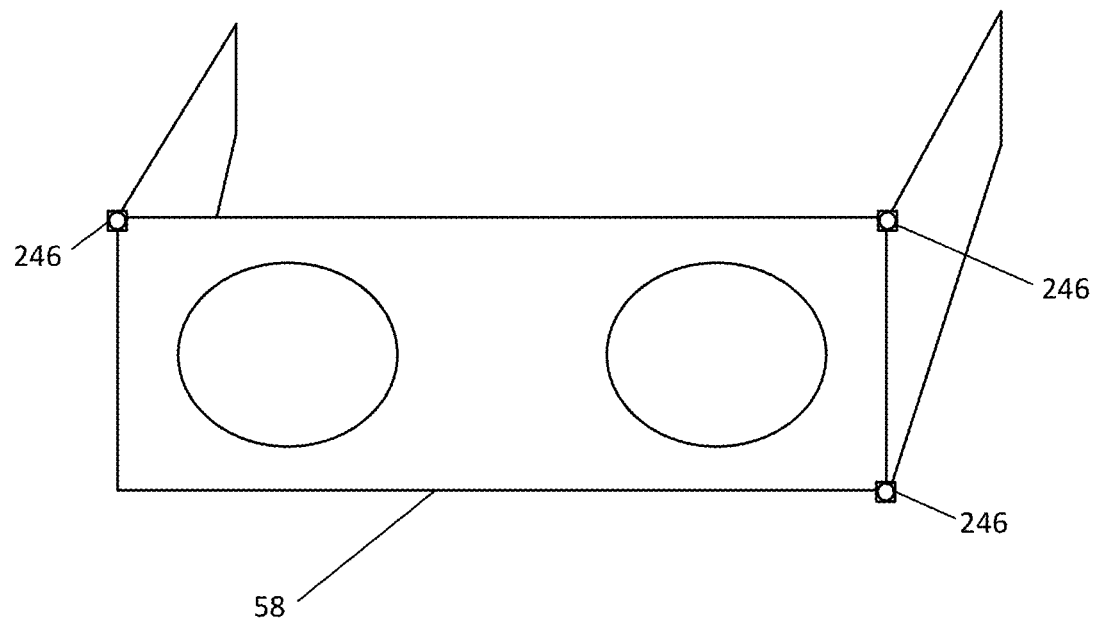
Figure 9C:
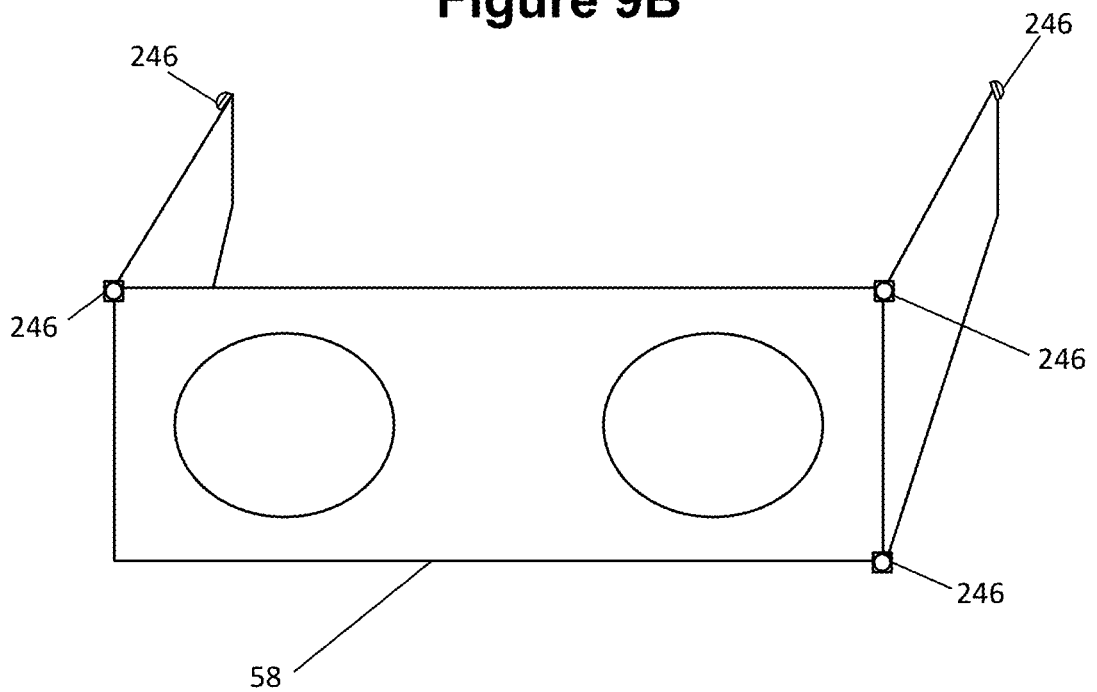

Referring to FIG. 9A, small fiducials (246), which may represent transmitting elements, such as infrared transmitters, or reflectors, such as small pluralities of mirrors, glass spheres, or other reflective elements, may be utilized to assist in the rapid determination of position and/or orientation between modules of a system with known or predetermined dimensions between one or more of the fiducials (246). For example, referring to FIG. 9B, in one embodiment of a head mounted component (58) with a plurality of fiducials (246) coupled thereto, the relatively long known lengths between the fiducials (246) may be utilized in determining and tracking relative position and/or orientation of such head mounted component (58) in space relative to a global coordinate system or relative to another component configured to track the fiducials with a camera or other device. FIG. 9C illustrates another head mounted component (58) configuration with additional fiducials (246) to provide additional information regarding the positioning and/or orientation of such construct.

Figure 9D:
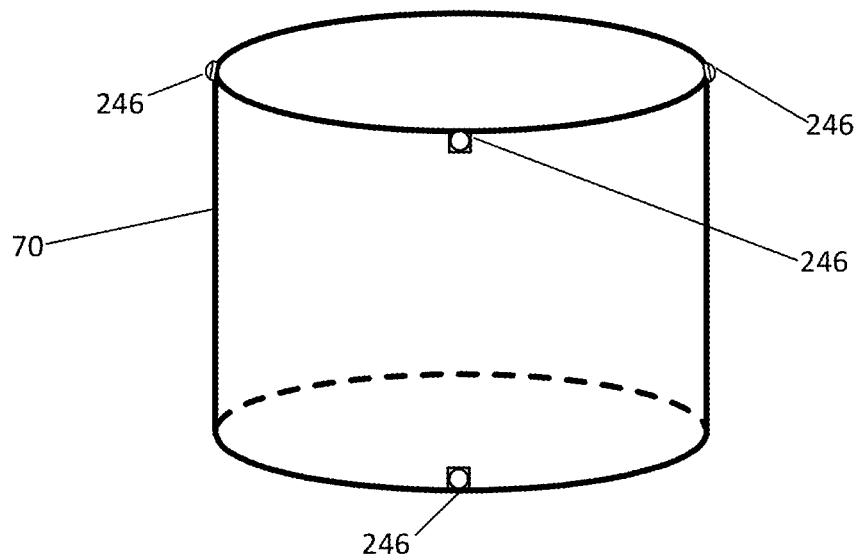
Figure 9E:
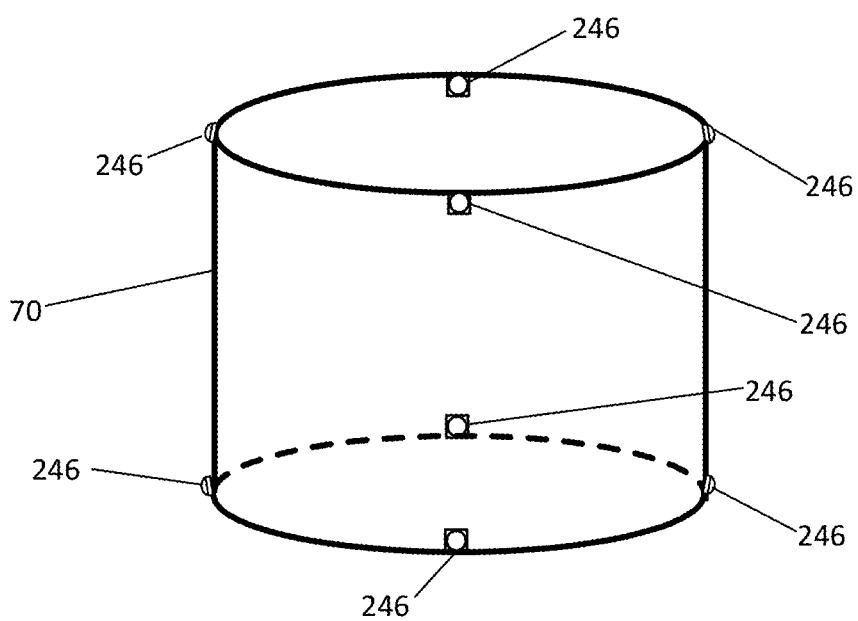

FIG. 9D illustrates a local processing and data module (70) configuration also having a plurality of fiducials (246) coupled thereto to assist in relative pose determination. FIG. 9E illustrates another embodiment of a local processing and data module (70) configuration having a larger plurality of fiducials (246) coupled thereto to assist in relative pose determination.

Figure 9F:
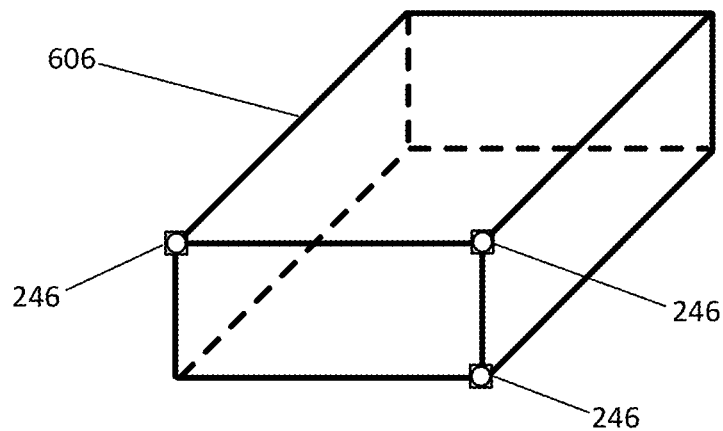
Figure 9G:
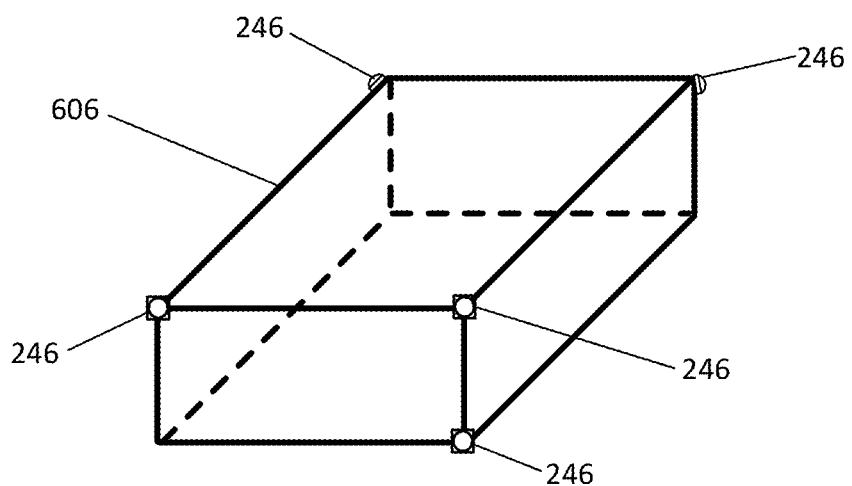

FIG. 9F illustrates a hand held controller module (606) configuration also having a plurality of fiducials (246) coupled thereto to assist in relative pose determination. FIG. 9G illustrates another embodiment of a hand held controller (606) configuration having a larger plurality of fiducials (246) coupled thereto to assist in relative pose determination.

Figure 9H:
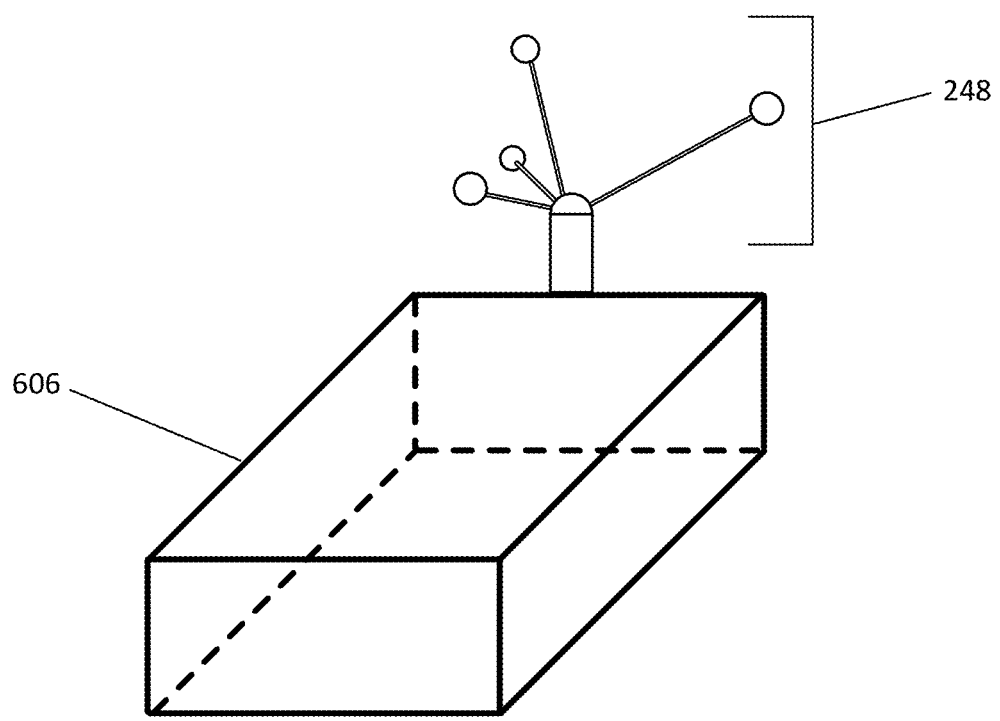
Figure 9I:
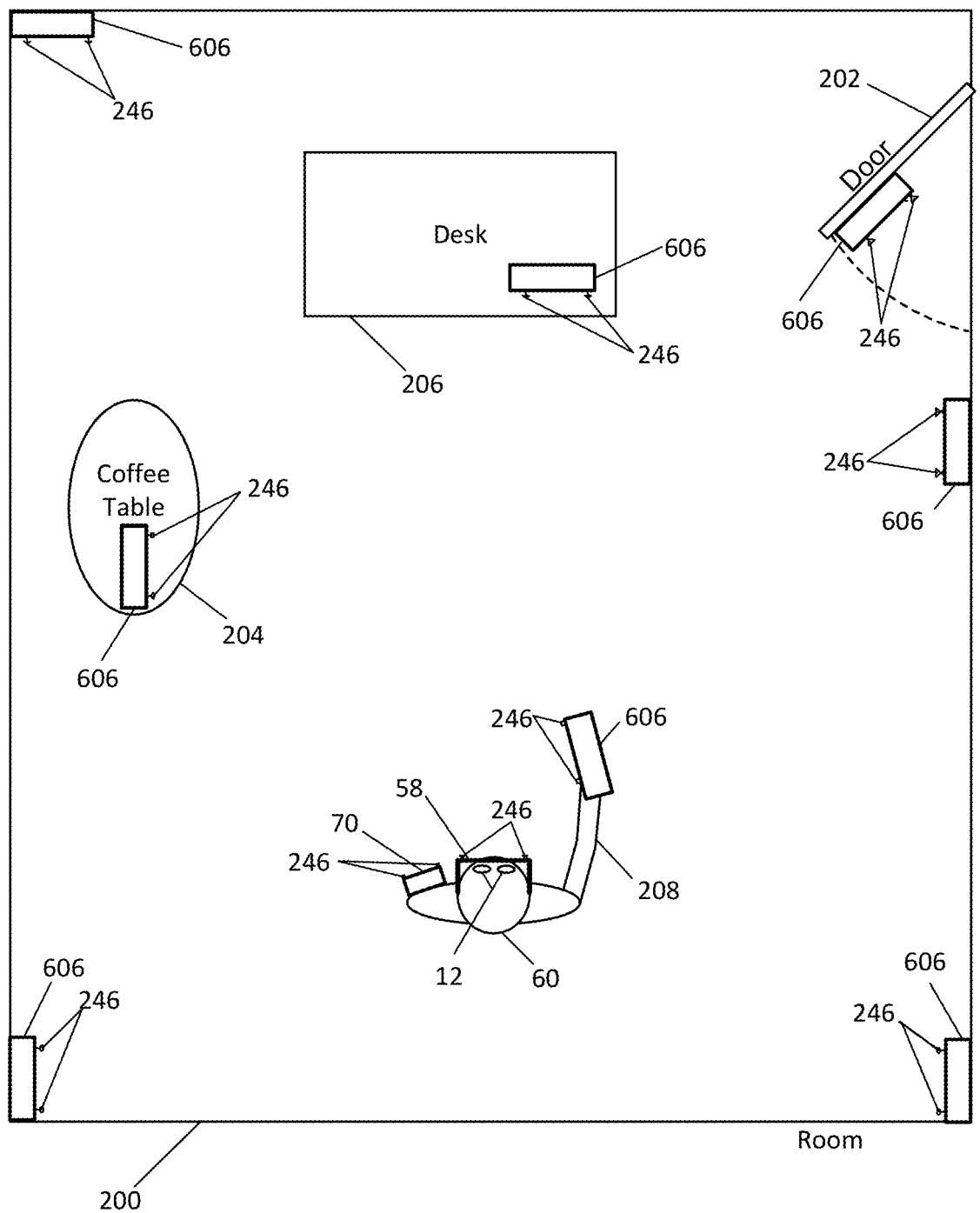

FIG. 9H illustrates a hand held controller module (606) configuration having a multi-fiducial array (248) coupled thereto to assist in relative pose determination; such fiducial arrays with known positions of sub-portions may be useful in pose determination when the geometry for them may be afforded, such as with an additional hand held controller module (606) to be placed on a coffee table or the like without as much geometric constraint as wearable components of a mobile computing system, for example. FIG. 9I illustrates a configuration wherein a plurality of additional controllers, such as hand held controller modules (606), in addition to one hand held controller (606) already coupled to the operator (60), may also be outfitted with fiducials (246) to assist in rapid pose determination of the relative components to each other.

Figure 10:
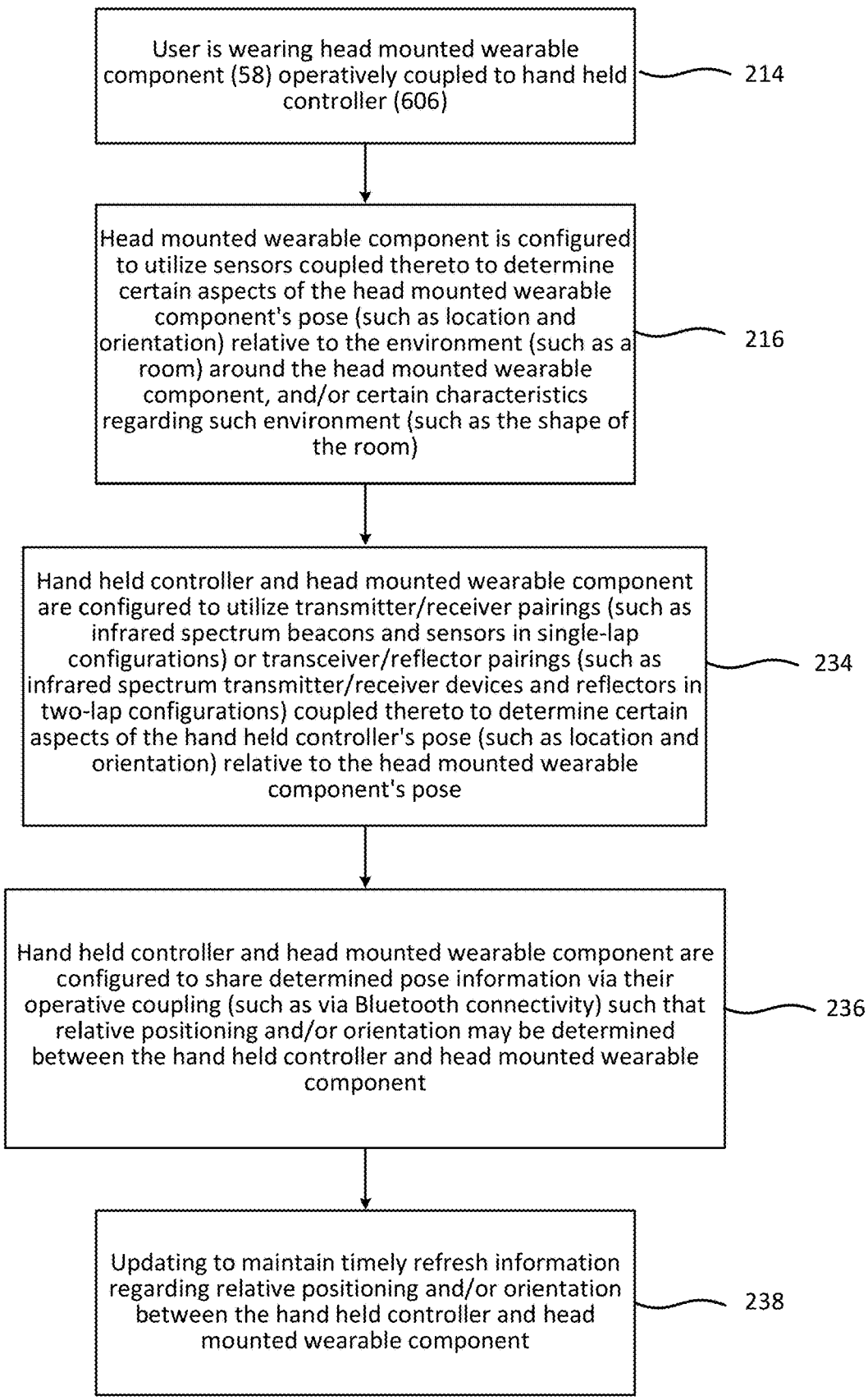
FIGS. 10-11 illustrates a configuration for utilizing an ecosystem of localization tools in accordance with embodiments of the present invention.

Referring to FIG. 10, in an embodiment such as that described in reference to FIG. 9A, a user (60) may be wearing head mounted wearable component (58) operatively coupled to hand held controller (606) (214). A head mounted wearable component (58) may be configured to utilize sensors coupled thereto to determine certain aspects of the head mounted wearable component's pose (such as location and orientation) relative to the environment (such as a room) around the head mounted wearable component, and/or certain characteristics regarding such environment (such as the shape of the room) (216). A hand held controller (606), such as one physically coupled to the operator's hand, and head mounted wearable component, may be configured to utilize fiducials, such as via transmitter/receiver pairings (such as infrared spectrum beacons and sensors in single-lap configurations) or transceiver/reflector pairings (such as infrared spectrum transmitter/receiver devices and reflectors in two-lap configurations) coupled thereto to determine certain aspects of the hand held controller's pose (such as location and orientation) relative to the head mounted wearable component's pose (234). The hand held controller (606) and head mounted wearable component (58) may be configured to share determined pose information via their operative coupling (such as via Bluetooth connectivity) such that relative positioning and/or orientation may be determined between the hand held controller and head mounted wearable component (236). Such operations may be updated frequently to maintain refresh information regarding relative positioning and/or orientation between the hand held controller and head mounted wearable component (238).

Figure 11:
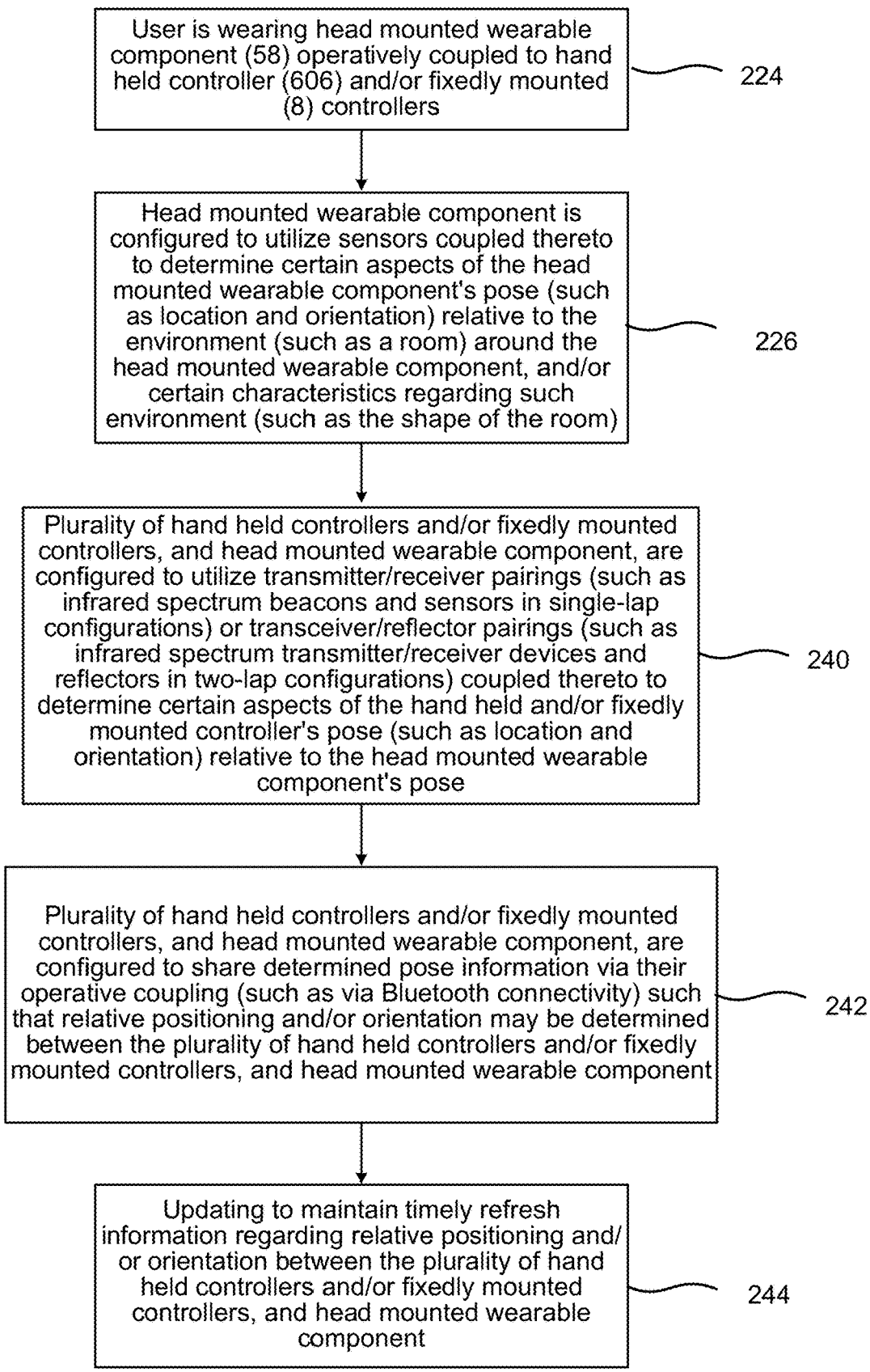

Referring to FIG. 11, with an embodiment such as that illustrated in FIG. 9I, a user (60) may be wearing a head mounted wearable component (58) operatively coupled to plurality of hand held style controllers (606) which may be physically coupled to the user or other objects of the surrounding room, such as walls (8) (224). A head mounted wearable component (58) may be configured to utilize sensors coupled thereto to determine certain aspects of the head mounted wearable component's pose (such as location and orientation) relative to the environment (such as a room) around the head mounted wearable component (58), and/or certain characteristics regarding such environment (such as the shape of the room) (226). The plurality of hand held controllers (606), and head mounted wearable component (58), may be configured to utilize fiducial configurations such as transmitter/receiver pairings (such as infrared spectrum beacons and sensors in single-lap configurations) or transceiver/reflector pairings (such as infrared spectrum transmitter/receiver devices and reflectors in two-lap configurations) coupled thereto to determine certain aspects of the hand held controllers' (606) pose (such as location and orientation) relative to the head mounted wearable component's (58) pose (240). The plurality of hand held controllers (606) and head mounted wearable component (58) may be configured to share determined pose information via their operative coupling (such as via Bluetooth connectivity) such that relative positioning and/or orientation may be determined between the plurality of hand held controllers (606) and head mounted wearable component (58) (242). Such operations may be updated frequently to maintain refresh information regarding relative positioning and/or orientation between the plurality of hand held controllers and/or fixedly mounted controllers, and head mounted wearable component (244).

Figure 12A:
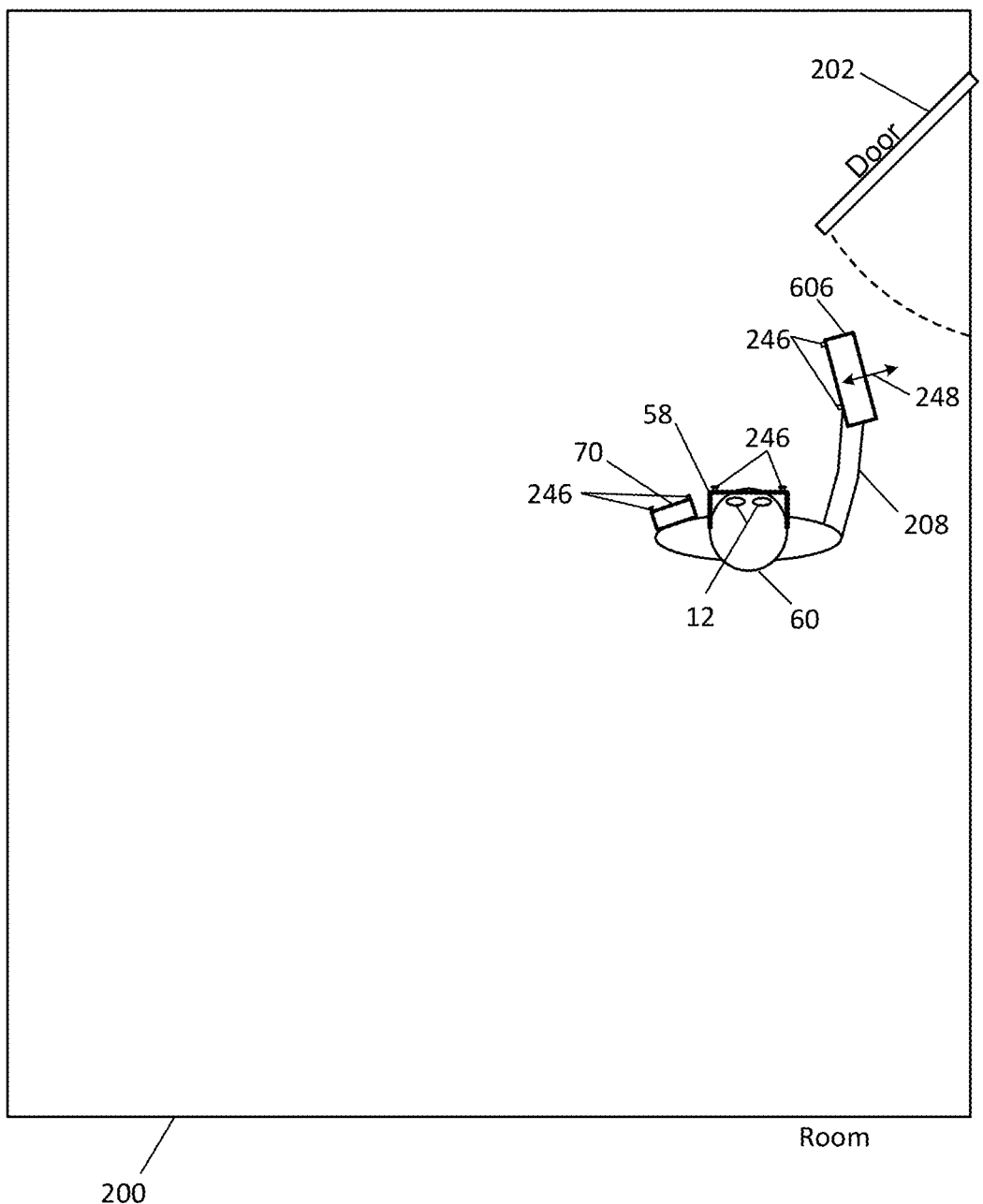
FIGS. 12A-12C illustrate examples of environment specific support modules in accordance with embodiments of the present invention.

Referring to FIG. 12A, another embodiment may be configured such that cyclical movement (248) of a hand held controller (606) may be utilized to further exploit the instrumentation contained thereon, for additional pose determination data from different locations/orientations of the hand held controller (606). In other words, if an operator (60) is particularly interested in the movement of a zone surrounding the door, the operator (60) may waive a hand held controller (60) around to assist the controller in utilizing sensors comprising the controller to capture additional information regarding such local environment from different perspectives, vectors, and/or orientations.

Figure 12B:
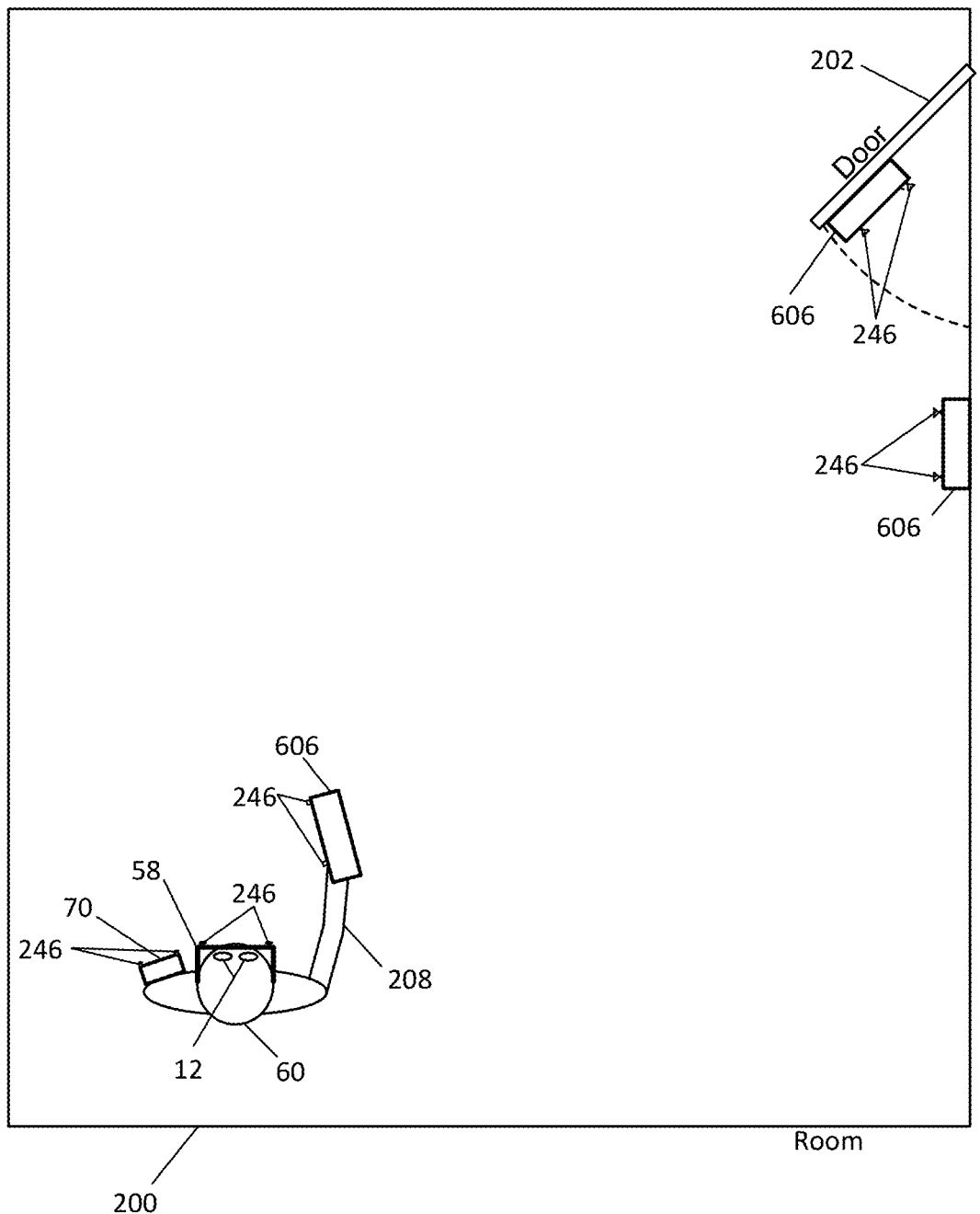
Figure 12C:
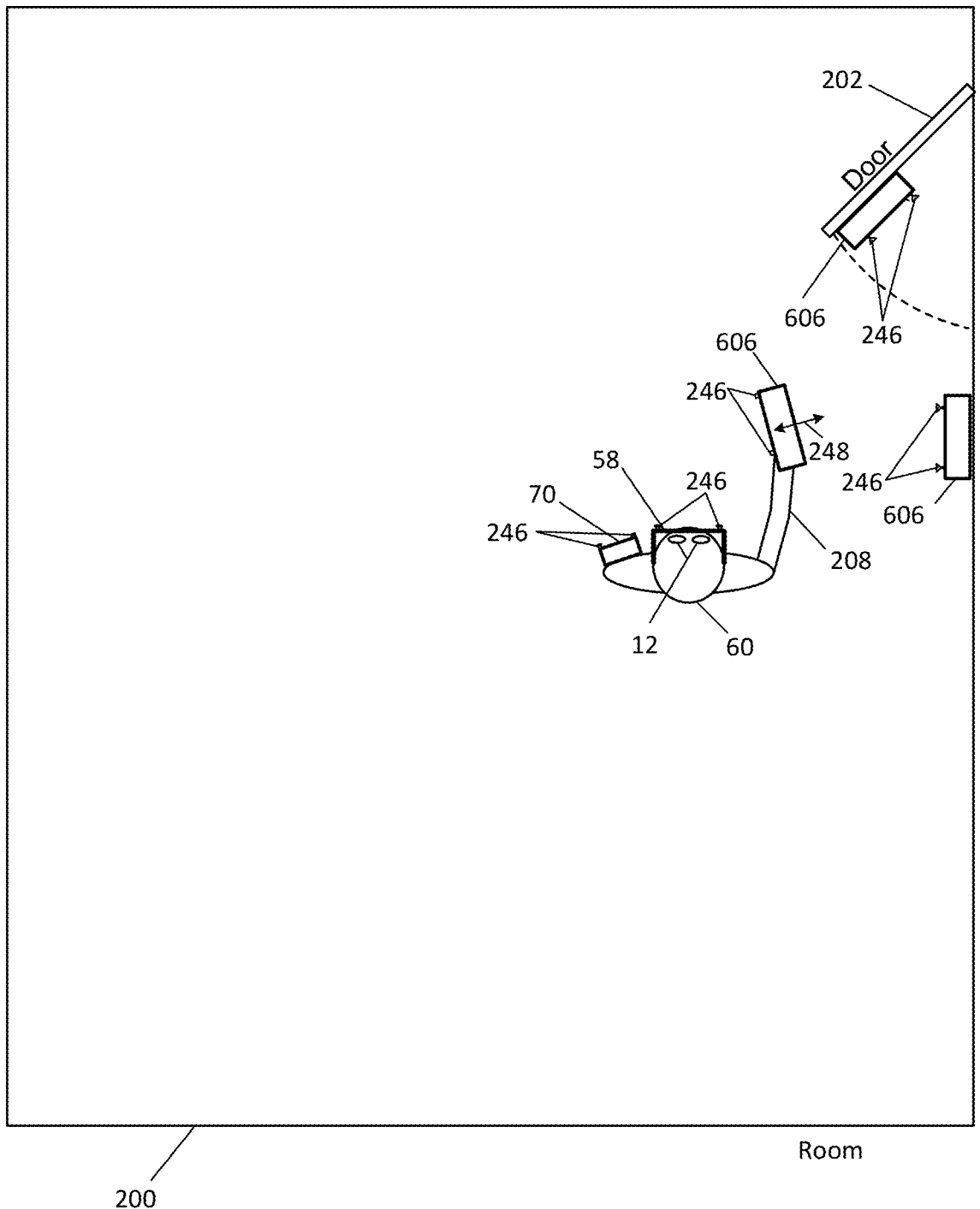

Such hand held cyclical motion requires the operator to be close to targeted structures, and this may not be desired or practical; the embodiment of FIG. 12B features a user (60) relatively far away from the subject door (202), but with two hand held controllers (606) mounted to the area of interest—one to a nearby wall and one to the door (202) itself. FIG. 12C illustrates an embodiment featuring both the cyclical motion (248) and additional sensing devices (606) as in FIG. 24B.

Figure 13:
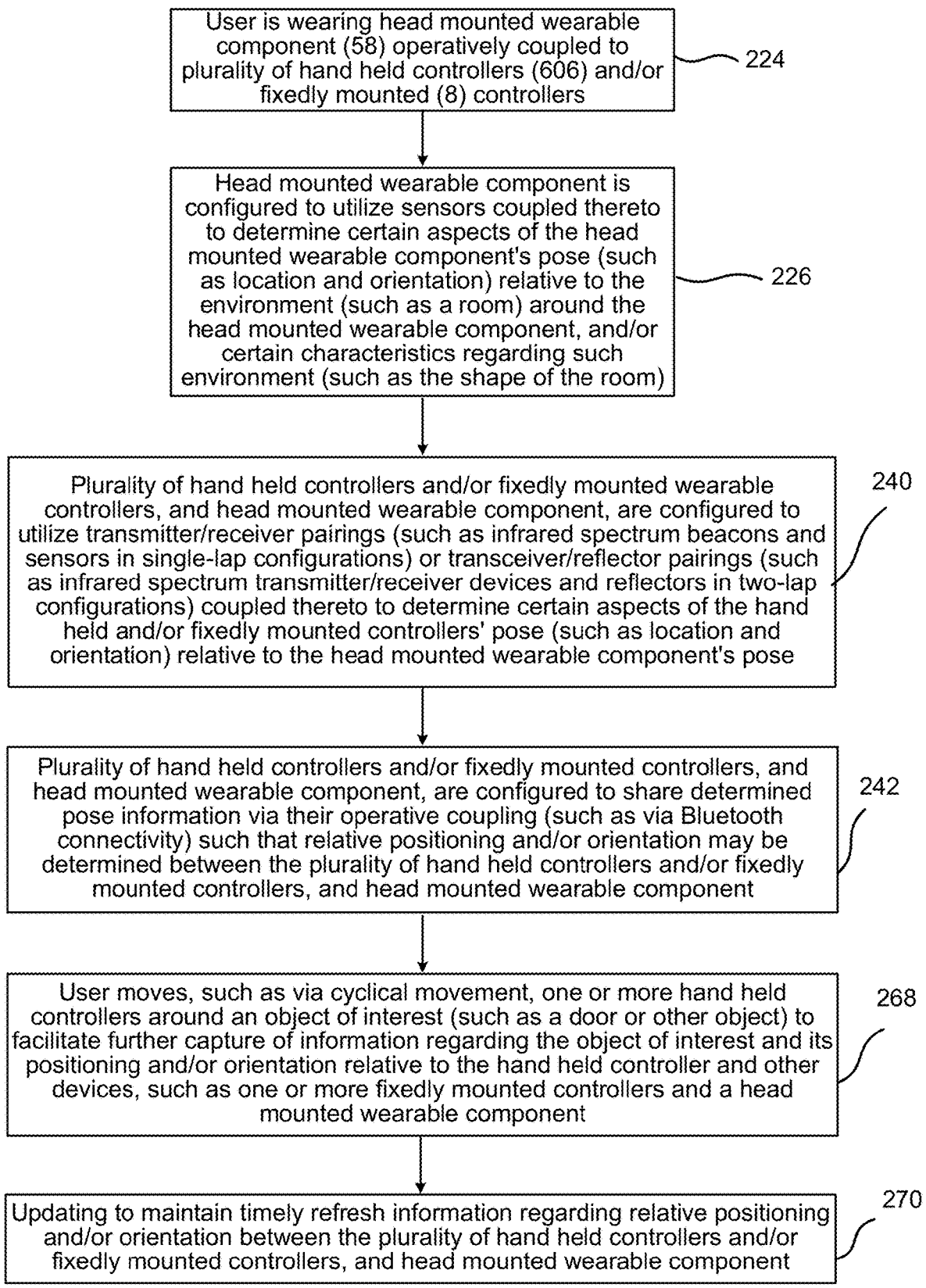
FIG. 13 illustrates an example configuration for utilizing an ecosystem of localization tools comprising environment specific support modules in accordance with embodiments of the present invention.

FIG. 13 illustrates a configuration similar to that of FIG. 11, with the addition of the user (60) moving, such as via cyclical motion or movement, one or more hand held controllers around an object or volume of interest, such around a door or other object, to facilitate further capture of information regarding the object or volume of interest and its positioning and/or orientation relative to the hand held controller (606) and other devices, such as one or more fixedly mounted controllers (606) and a head mounted wearable component (58). Such operations may be updated frequently to maintain refresh information regarding relative positioning and/or orientation between the plurality of hand held controllers and/or fixedly mounted controllers, and head mounted wearable component (270).

Various exemplary embodiments of the invention are described herein. Reference is made to these examples in a non-limiting sense. They are provided to illustrate more broadly applicable aspects of the invention.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

What is claimed is:

1. A method of localizing a user operating a plurality of sensing components, the method comprising:
   transmitting a first pose data by a control and processing module;
   receiving the first pose data at a first component;
   transforming the first pose data into a first component relative pose in a coordinate frame based on the control and processing module;
   updating a display unit in communication with the first component with the first component relative pose,
   receiving the first pose data at a second component;
   transforming the first pose data into a second component relative pose in a coordinate frame based on the control and processing module;
   sharing the second component relative pose with the first component; and
   updating the first component relative pose based on the second component relative pose.

2. The method of claim 1, wherein the first component comprises a head mounted wearable component.

3. The method of claim 2, wherein the second component comprises a hand held component.

4. The method of claim 1, wherein the first component comprises a hand held wearable component.

5. The method of claim 4, wherein the second component comprises a head mounted component.

6. The method of claim 1, wherein transmitting the first pose data comprises transmitting electromagnetic field signals.

7. The method of claim 6, wherein the electromagnetic field signals are in the visible spectrum.

8. The method of claim 6, wherein the electromagnetic field signals are in the infrared spectrum.

9. The method of claim 1, wherein receiving the first pose data comprises visual capture of an infrared marker.

10. The method of claim 1, wherein receiving the first pose data comprises visual capture of a fiducial marker.

11. A method of localizing a user operating a plurality of sensing components, the method comprising:
  receiving environmental characteristics indicating positional information at a head mounted component;
  determining a head mounted component pose in an environment coordinate frame of the head mounted component based on the received environmental characteristics;
  receiving, at the head mounted component, relative positional aspects with respect to the head mounted component of at least one hand held component;
  determining a relative hand held component pose of the at least one hand held component in a head mounted component coordinate frame;
  receiving, at the least one hand held component, the relative positional aspects with respect to the head mounted component;
  transforming the relative positional aspects into a relative hand held component pose in the head mounted component coordinate frame;
  sharing the head mounted component pose in the environment coordinate frame with the at least one hand held component and sharing the relative hand held component pose in the head mounted component coordinate frame with the head mounted component;
  updating the head mounted component pose in the environment coordinate frame based on the relative hand held component pose; and
  updating the relative hand held component pose in the head mounted component coordinate frame based on the head mounted component pose in the environment coordinate frame.

12. The method of claim 11, further comprising, transmitting the relative positional aspects to the head mounted component from a control and processing module in the environment coordinate frame prior to updating the relative hand held component pose.

13. The method of claim 11, wherein updating the head mounted component pose in the environment coordinate frame is performed prior to updating the relative hand held component pose in the head mounted component coordinate frame.

14. The method of claim 11, further comprising transforming the relative hand held component pose in the head mounted component coordinate frame into a hand held component pose in the environment coordinate frame.

15. The method of claim 11, further comprising transmitting the relative positional aspects to the at least one hand held component from a control and processing module in the environment coordinate frame.

16. The method of claim 15, further comprising determining a hand held component pose in the environment coordinate frame.

17. The method of claim 16, further comprising updating the relative hand held component pose shared with the head mounted component with the hand held component pose in the environment coordinate frame.

18. The method of claim 11, wherein receiving environmental characteristics comprises image based feature extraction and localization.

* * * * *